(12) United States Patent
Okubo

(10) Patent No.: US 9,055,165 B2
(45) Date of Patent: Jun. 9, 2015

(54) COMMUNICATION SYSTEM FOR ESTABLISHING A TELEPHONE CALL OR A DATA COMMUNICATION

(75) Inventor: Ryosuke Okubo, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 13/583,767

(22) PCT Filed: Mar. 11, 2011

(86) PCT No.: PCT/JP2011/001438
§ 371 (c)(1),
(2), (4) Date: Sep. 10, 2012

(87) PCT Pub. No.: WO2011/125288
PCT Pub. Date: Oct. 13, 2011

(65) Prior Publication Data
US 2013/0003953 A1 Jan. 3, 2013

(30) Foreign Application Priority Data

Apr. 8, 2010 (JP) ................................ 2010-089098

(51) Int. Cl.
*H04M 11/00* (2006.01)
*H04M 1/725* (2006.01)

(52) U.S. Cl.
CPC ................... *H04M 1/7255* (2013.01)

(58) Field of Classification Search
CPC ............ H04M 3/42365; H04M 1/663; H04M 11/066; H04M 3/48
USPC ......................................... 379/88.21, 210.01
See application file for complete search history.

(56) References Cited

U.S. PATENT DOCUMENTS 6,310,944 B1 * 10/2001 Brisebois et al. ........ 379/142.01
6,968,052 B2 * 11/2005 Wullert, II ............... 379/210.01
(Continued)

FOREIGN PATENT DOCUMENTS

CN 101095335 A 12/2007
CN 101330541 A 12/2008
(Continued)

OTHER PUBLICATIONS

Office Action dated Apr. 30, 2014, issued by the State Intellectual Property Office of P.R.C. in corresponding Chinese Application No. 201180014349.5
(Continued)

*Primary Examiner* — Fan Tsang
*Assistant Examiner* — Van D Huynh
(74) *Attorney, Agent, or Firm* — Sughrue Mion, PLLC

(57) ABSTRACT

A calling side communication apparatus includes a communication function executing means 11, a non-real time call sending means 12 for sending, in accordance with user operation, a non-real time call which is a request of telephone call which continues until a user at the other side responds or until a predetermined cancellation condition is satisfied. A called side communication apparatus includes a communication function executing means 21, a non-real time call receiving means 22 for receiving the non-real time call without entailing forcible ringing, a receiving call displaying means 23 for displaying, to a user, information about the non-real time call currently in the call reception state, and a non-real time call responding means 24 for establishing a telephone call or a data communication with the communication apparatus that sent the non-real time call, in accordance with a response operation given by the user in reply to the non-real time call currently in the call reception state.

12 Claims, 12 Drawing Sheets

300

| STATE | CALLER | TITLE | EXPIRATION DATE/TIME |
|---|---|---|---|
| VALID | TARO NICHIDEN | SCHEDULE OF REGULAR MEETING | ~17:30 |
| VALID | JIRO TAMACHI | QUESTION ABOUT DRAWING CONFIGURATION DIAGRAM | --- |
| VALID | HANAKO YAMADA | GREETINGS | ~17:00 |

(56) References Cited

U.S. PATENT DOCUMENTS

| | | | |
|---|---|---|---|
| 6,977,993 B2 * | 12/2005 | Starbuck et al. | 379/88.21 |
| 2008/0081569 A1 | 4/2008 | Shiono | |
| 2009/0296904 A1 * | 12/2009 | Brewer et al. | 379/93.23 |

FOREIGN PATENT DOCUMENTS

| | | |
|---|---|---|
| JP | 8-228236 A | 9/1996 |
| JP | 2004-7144 A | 1/2004 |
| JP | 2005-286680 A | 10/2005 |
| JP | 2007-181133 A | 7/2007 |
| JP | 2007-235676 A | 9/2007 |
| JP | 2008-288788 A | 11/2008 |
| JP | 2009-246442 A | 10/2009 |
| JP | 201089098 A | 4/2010 |
| WO | 2009151947 A1 | 12/2009 |

OTHER PUBLICATIONS

Communication dated Mar. 16, 2015, issued by the European Patent Office in counterpart Application No. 11765190.1.

* cited by examiner

300

| STATE | CALLER | TITLE | EXPIRATION DATE/TIME |
|---|---|---|---|
| VALID | TARO NICHIDEN | SCHEDULE OF REGULAR MEETING | ~17:30 |
| VALID | JIRO TAMACHI | QUESTION ABOUT DRAWING CONFIGURATION DIAGRAM | --- |
| VALID | HANAKO YAMADA | GREETINGS | ~17:00 |

COMMUNICATION SYSTEM FOR ESTABLISHING A TELEPHONE CALL OR A DATA COMMUNICATION

CROSS REFERENCE TO RELATED APPLICATIONS

This application is a National Stage of International Application No. PCT/JP2011/001438 filed on Mar. 11, 2011, which claims priority from Japanese Patent Application No. 2010-089098, filed on Apr. 8, 2010, the contents of all of which are incorporated herein by reference in their entirety.

TECHNICAL FIELD

The present invention relates to a communication system, a communication apparatus, a communication control method, and a communication program for establishing a telephone call or a data communication between two or more users, and more particularly, to a communication system, a communication apparatus, a communication control method, and a communication program for establishing a telephone call or a data communication which is initiated upon intentions indicated by both of a calling user and a called user.

BACKGROUND ART

In general, in telephone communication allowing direct conversation with a destination, there is an advantage in that detailed information can be immediately exchanged, but both of a calling person and a called person have to be ready for telephone call at the same time. For the above technique for efficiently establishing a telephone call which is initiated upon intentions indicated by both of a calling user and a called user, various suggestions have been made so far.

For example, PTL 1 discloses a technique in which a receiving call condition is set in advance by a called side for the purpose of allowing both of a calling side and the called side to reliably establish a highly important telephone call, and only when an outgoing call condition of the calling side and the receiving call condition of the called side match each other, the receiving call is automatically received.

PTL 2 and PTL 3 disclose techniques in which, when the called side is absent, a notification is sent as soon as the called side becomes ready to respond the call, or a notification is sent to indicate when the called side becomes available to respond the call, for the purpose of preventing waste of a time which is required to establish a telephone call due to the absence of one of them. PTL 4 discloses a technique in which a sending party of an e-mail writes, in the text body of the e-mail, to ask for making a telephone call at a specified time, so that the receiving party automatically analyzes the e-mail and makes a call to the sending party.

CITATION LIST

Patent Literature

PTL 1: Japanese Patent Application Laid-Open (JP-A) No. 2008-288788
PTL 2: JP-A No. 2005-286680
PTL 3: JP-A No. 2007-181133
PTL 4: JP-A No. 2009-246442

SUMMARY OF INVENTION

Technical Problem

In the technique disclosed in PTLs 1 to 4, however, it is assumed that both the calling person and the called person are actively want to make a telephone call, but in reality, the calling side and the called side are often less willing to make a telephone call, since, for example, the calling side may think that "the called person seems to be busy and it would not be appropriate to contact him/her" or "it may be impolite to call at this time", and the called side may think that "although there is a receiving call, I am too busy to take the telephone call" or "I do not want to respond to the call because what has to be reported to the calling side has not yet made much progress".

In other words, if there is a difference in the situation between the calling user and the called user when a telephone call is made upon intentions indicated by both of the calling user and the called user, there is a problem in that the users may have psychological burden, which disturbs smooth communication. All of the techniques disclosed in PTLs 1 to 4 have the purpose of only improving the time efficiency of telephone calls, and are unable to reduce the psychological burden of the users as described above.

Accordingly, it is an object of the present invention to provide a communication system, a communication apparatus, a communication control method, and a communication program that reduce the psychological burden of users which occur during an establishing process of a telephone call or a data communication initiated upon intentions indicated by both of the calling user and the called user and that can efficiently establish the telephone call or the data communication.

Solution to Problem

A communication system according to the present invention includes a calling side communication apparatus used by a calling user and a called side communication apparatus used by a called user, wherein the calling side communication apparatus includes communication function executing means for executing a telephone call or a data communication with a specified communication apparatus, and non-real time call sending means for sending, in accordance with user operation, a non-real time call which is a request of telephone call without entailing forcible ringing and is a request of telephone call which continues until a user at the other side responds or until a predetermined cancellation condition is satisfied, and the called side communication apparatus includes communication function executing means for executing a telephone call or a data communication with a specified communication apparatus, non-real time call receiving means for receiving, without entailing forcible ringing, a non-real time call made to the communication apparatus, receiving call displaying means for displaying, to the user, information about a non-real time call currently in a call reception state, and non-real time call responding means for establishing a telephone call or a data communication with the communication apparatus that sent the non-real time call, in accordance with a response operation given by the user in reply to the non-real time call currently in the call reception state.

A communication apparatus according to the present invention includes communication function executing means for executing a telephone call or a data communication with a specified communication apparatus, non-real time call sending means for sending, in accordance with user operation, a non-real time call which is a request of telephone call without entailing forcible ringing and is a request of telephone call which continues until a user at the other side responds or until a predetermined cancellation condition is satisfied, non-real time call receiving means for receiving, without entailing forcible ringing, a non-real time call made to the communication apparatus, receiving call displaying means for displaying, to the user, information about a non-real time call currently in a call reception state, and non-real time call responding means for establishing a telephone call or a data communication with the communication apparatus that sent the non-real time call, in accordance with a response operation given by the user in reply to the non-real time call currently in the call reception state.

A communication control method according to the present invention for establishing a telephone call or a data communication with a specified communication apparatus, wherein the communication control method includes causing a calling side communication apparatus to send, in accordance with user operation, a non-real time call which is a request of telephone call without entailing forcible ringing and is a request of telephone call which continues until a user at the other side responds or until a predetermined cancellation condition is satisfied, causing the called side communication apparatus to receive the non-real time call made to the communication apparatus, without entailing forcible ringing, and to hold information about the received non-real time call in such a manner that the information can be presented to a user at all times while at least the non-real time call continues, and causing the called side communication apparatus to establish a telephone call or a data communication with the communication apparatus that sent the non-real time call, in accordance with a response operation given by the user in reply to the non-real time call currently in the call reception state.

A communication program according to the present invention for a computer having a communication function for performing a telephone call or a data communication with a specified communication apparatus, wherein the communication program causes the computer to execute non-real time call sending processing for sending, in accordance with user operation, a non-real time call which is a request of telephone call without entailing forcible ringing and is a request of telephone call which continues until a user at the other side responds or until a predetermined cancellation condition is satisfied, non-real time call reception processing for receiving the non-real time call made to the communication apparatus, without entailing forcible ringing, receiving call display processing for displaying, to a user, information about the non-real time call currently in the call reception state, and non-real time call response processing for establishing a telephone call or a data communication with the communication apparatus that sent the non-real time call, in accordance with a response operation given by the user in reply to the non-real time call currently in the call reception state.

Advantageous Effects of Invention

According to the present invention, a telephone call or a data communication initiated upon intentions indicated by both of a calling user and a called user can be established without placing psychological burden on the calling user and the called user. For example, the calling user can make a call without caring about the availability of the called user. In particular this is suitable for a message, a request, a brief review, explanation about and understanding of the current situation, and inquiry which are required to be communicated orally although the degree of importance is not so high, and is also suitable for data sending requiring the other party to receive the sending without failure such as classified video distribution and file sending. In addition, for example, the called user can respond at any time convenient for the called user. In particular, this is suitable for a case where a user is tied up with a task and is unable to immediately make or receive a telephone call, and a case where it is necessary to make preparation in order to make or receive a telephone call.

The reason for the above is that an outgoing call does not entail forcible ringing, and a call request continues (for example, several hours), even though it is a quasi call request, and therefore, a telephone call or a data communication can be made by responding at any time, which enables the called side to take a telephone call or a data communication by responding at any time within the continued call request.

DESCRIPTION OF EMBODIMENTS

Hereinafter, embodiments of the present invention will be described with reference to drawings. In each embodiment, a case where the present invention is applied to a softphone having a GUI will be explained. However, the present invention is not limited to the softphone having the GUI, and the present invention can be applied to any apparatus (including program) having a communication function such as a cell phone, a smartphone, a POS terminal, and a fixed phone. For example, it may be voice chat software. For example, even in a case of an Interactive Voice Response system (IVR) that does not have any GUI, the Interactive Voice Response system can perform the same operation by reading the contents of GUI.

First Embodiment

Figures 1, 2:
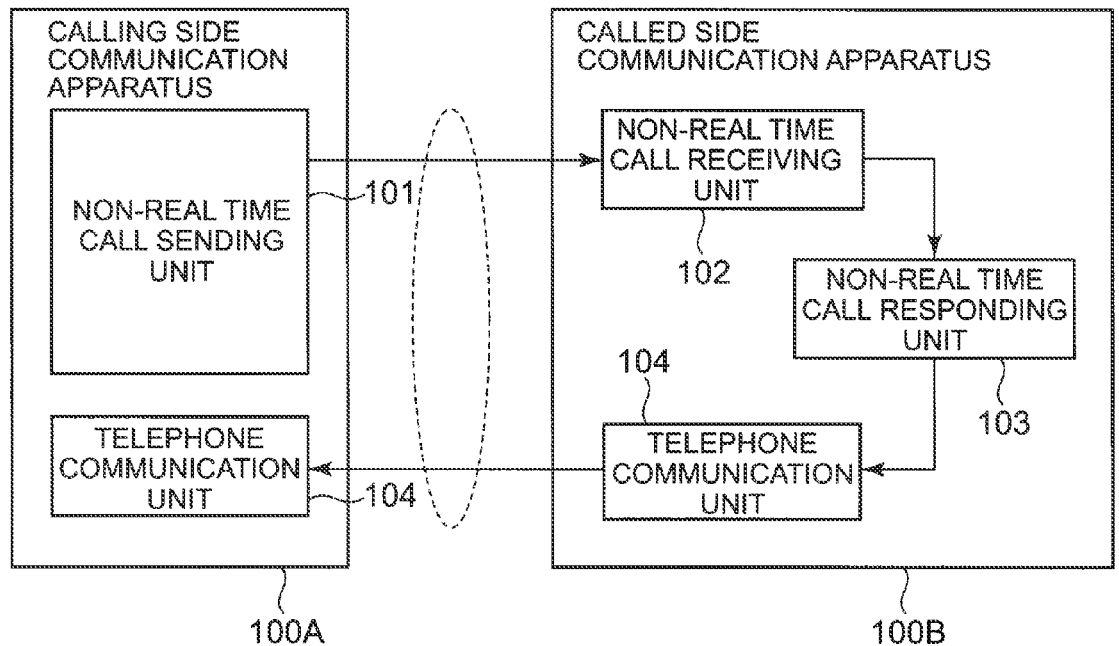
FIG. 1 is a block diagram illustrating an example of schematic configuration of a communication apparatus according to a first embodiment.
FIG. 2 is an explanatory diagram illustrating an example of a GUI displayed when a non-real time call is made.

FIG. 1 is a block diagram illustrating an example of schematic configuration of a communication apparatus according to a first embodiment. The communication system as illustrated in FIG. 1 includes a communication apparatus (calling side communication apparatus) 100A used by a calling user and a communication apparatus (called side communication apparatus) 100B used by a called user. The calling side communication apparatus 100A and the called side communication apparatus 100B are connected via a communication network 200. It should be noted that the communication network 200 may be either a wired communication network or a wireless communication network as long as it is a communication network in which a telephone call can be made. It is assumed that the communication network 200 includes various kinds of control apparatus which are required to allow the communication system to send telephone call, such as a switching equipment.

The calling side communication apparatus 100A includes a non-real time call sending unit 101 and a telephone communication unit 104. On the other hand, the called side communication apparatus 100B includes a non-real time call receiving unit 102, a non-real time call responding unit 103, and the telephone communication unit 104.

In FIG. 1, the calling side communication apparatus 100A and the called side communication apparatus 100B have different configurations. Alternatively, the calling side communication apparatus 100A and the called side communication apparatus 100B may be achieved using a communication apparatus including functions for both of the calling side and the called side. More specifically, each of the communication apparatuses 100A, 100B may include the non-real time call sending unit 101, the non-real time call receiving unit 102, the non-real time call responding unit 103, and the telephone communication unit 104.

The non-real time call sending unit 101 performs calling side processing for achieving a non-real time call defined by the present invention.

In the present invention, from the perspective of the user, the non-real time call is defined as "a continuous request of telephone call that does not bother the called user, which is made while the called user can find at least the state as to whether the calling user can take a telephone call or not". It should be noted that the "request of telephone call" referred to herein means an intention of making a telephone call, and means a concept corresponding to a signal of, for example, "ringing" or "call originating request (or call request) in a generally-available communication system. In other words, the non-real time call is a request of telephone call that is made continuously while the calling user wants to make a telephone call, and the non-real time call can also be referred to as a request of telephone call without entailing forcible ringing. In this case, the forcible ringing means a ringing that interrupts a work of the called person. For example, the forcible ringing is a notification of a receiving call to a user which is achieved using an expression method that does not accept any input other than response to the receiving call. Therefore, the communication request that does not entail any forcible ringing can also be referred to as a communication request that is defined in advance as a communication request to which it is not necessary to respond immediately when the communication request is received.

In a case of data communication, the above definition may be read by replacing the "request of telephone call" with the "communication request". Hereinafter, a telephone call initiated upon a non-real time call may be referred to as a "non-real time call telephone call (NRC telephone call)", and a data communication initiated upon a non-real time call may be referred to as a "non-real time call communication (NRC communication)".

In the present invention, a method for continuing the request of telephone call is not particularly limited. For example, the request of telephone call may be continued by actually continuing a link to be established while the calling user wants to make a telephone call. For example, the request of telephone call can also be continued, without actually establishing a link, by continuing to establish a quasi link to periodically send, for example, a signal indicating the request of telephone call is effective while the calling user wants to make a telephone call. When the request of telephone call continues using the quasi link, what is expressed as "response" from the perspective of user operation may be "calling (calling back)" from the internal perspective.

In the present embodiment, the non-real time call sending unit 101 sends a non-real time call starting signal to the called side communication apparatus 100B in accordance with user operation. During the non-real time call, a non-real time call state notifying signal is sent with predetermined timing (for example, with a regular interval and when the state changes).

In this case, non-real time call starting signal is a signal that is initially sent from the calling side communication apparatus to the called side communication apparatus in order to establish a non-real time call telephone call, and is a signal conveying intention of making a non-real time call. The non-real time call starting signal may include not only basic information included in a generally available call originating request such as the type of signal and destination information about the called side but also, for example, the title of topic of a telephone call in question, outline of the topic, and an expiration date/time that is set manually. As described above, the topic of the telephone call is notified in advance, so that this can eliminate psychological burden of the called user that may be invoked by an unknown telephone call, and this allows the called user assess the degree of priority and the degree of importance of a response to the request.

On the other hand, the non-real time call state notifying signal is a signal that is sent continuously from the calling side communication apparatus to the called side communication apparatus after the non-real time call starting signal, and is a signal indicating, as the state of the calling user, that the calling user continues to at least want to make a telephone call by means of non-real time call. It should be noted that the non-real time call state notifying signal is a signal also notifying that the non-real time call continues in the calling side communication apparatus upon the sending thereof. The non-real time call state notifying signal may include not only the basic information but also presence information of the calling side. Depending on the situation of the called side communication apparatus, the reception of the non-real time call may not be recognized, and therefore, the non-real time call state notifying signal may repeatedly include, for example, information about the topic and the expiration date/time, which are added to the non-real time call starting signal.

It should be noted that the presence information is information indicating the state of the apparatus or the user of the apparatus (in this case, the calling user), and in the present invention, in particular, the presence information means information indicating whether the telephone call is possible or not. It is assumed that, for example, what kind of information is represented with what kind of value is defined in advance as the presence information.

The non-real time call sending unit 101 may send a non-real time call cancelling signal when, for example, the user performs operation to cancel the non-real time call. The non-real time call cancelling signal is a signal indicating that the non-real time call sent previously is withdrawn. It is assumed that a signal sent and received for one non-real time call is attached with information for distinguishing the signal of the non-real time call in question from signals of other non-real time calls (hereinafter referred to as non-real time call identification information). The method for generating the non-real time call identification information is not particularly limited. In a case where an expiration date/time is added to the non-real time call starting signal, each of the non-real time call sending unit 101 and the non-real time call receiving unit 102 may perform processing to cancel calling and receiving of the non-real time call when the expiration date/time comes.

In addition, according to user operation, the non-real time call sending unit 101 may perform processing to send, for example, a non-real time call invalid signal indicating that a non-real time call is invalid (i.e., temporarily withdrawn) and a non-real time call invalid cancelling signal indicating that the invalidation is cancelled. It should be noted that invalidation/validation of the non-real time call may be sent in such a manner that it is attached as presence information to the non-real time call state notifying signal.

In the called side processing for achieving the non-real time call, the non-real time call receiving unit 102 performs processing when a receiving call is being received and during call reception (in the present example, during continuation of non-real time call or response waiting state). More specifically the non-real time call receiving unit 102 receives a call made with non-real time call, continuously maintains the state as to whether the calling user can communicate or not while the non-real time call continues, and performs processing of displaying it to the user as necessary.

More specifically, when the non-real time call receiving unit 102 receives a non-real time call starting signal from the calling side communication apparatus 100A, the non-real time call receiving unit 102 receives the non-real time call without entailing any forcible ringing. When the non-real time call receiving unit 102 receives the non-real time call, the non-real time call receiving unit 102 uses a GUI to display a message indicating that the non-real time call is received to the user, and proceeds to the state of call reception. When the non-real time call receiving unit 102 proceeds to the state of call reception, the non-real time call receiving unit 102 also notifies the non-real time call responding unit 103 of the receiving call. In addition, as necessary, information about the non-real time call is displayed. It should be noted that indication displayed when the receiving call is being received is executed using a method that does not cause the user to interrupt a current work.

For example, it is preferable to display the indication as a list together with other non-real time calls received at other points in time. The information about the non-real time call in the call reception is not forcibly displayed in the foreground but is displayed with the minimum size in accordance with user operation and setting, so that the user (called person) can find the information only when it is necessary to do so. In this case, "the information displayed with the minimum size" means that the information is displayed in such a manner that the information does not lie outside of a range defined by user setting. The range defined by the user setting includes timing of display, the displayed contents, and the display method.

When the non-real time call state notification notifies that the non-real time call in the call reception is a non-real time call that is less likely to establish a telephone call as the calling person is currently absent, or when such state is determined, it is desirable to display the information about the non-real time call in the call reception in such an expression that the called person can find such circumstances. For example, information indicating the state of the calling person, for example, the calling person is absent, may be attached and displayed, or the decorative expression such as color and shape may be changed and displayed, or the non-real time call may be displayed in a separate list. Alternatively, the above may be employed in combination.

When the non-real time call receiving unit 102 receives a non-real time call, it is desirable for the non-real time call receiving unit 102 to notify the user that the non-real time call is received. This call reception notification is not to perform forcible ringing process during a period in which a receiving call is effective, such as a bell of a conventional telephone. Just like notification operation during reception of an e-mail, this call reception notification does not bother a work being performed by the called person. Examples of methods of notification include sound, light such as an LED, a balloon indication, a toast pop-up, and a modeless dialog on a GUI.

When the called side communication apparatus is a communication apparatus that does not have any GUI, for example, the called side communication apparatus may notify the user to that effect by reading aloud, using spoken sound, the contents displayed on the GUI. Contents that are used only when the contents are read aloud with the spoken sound may be prepared separately from the contents displayed on the GUI. When the user is talking in another telephone call or when the user is performing another operation with the communication apparatus, the notification given at the time of receiving call may be notified using a method that does not bother user operation, for example, by illuminating or blinking an LED, without reading aloud the notification given at the time of receiving call with the spoken sound. Depending on the setting, such notification method may be employed at all times. Alternatively, the notification given at the time of receiving call may be omitted. For example, only when the user performs confirmation operation, the information about the non-real time call currently in the call reception state may be read aloud. In the telephone call which does not require a high degree of real time property, even the above notification method can sufficiently fulfill its function.

When the non-real time call receiving unit 102 does not receive a non-real time call state notifying signal from the calling side communication apparatus with a regular period of time, for example, when the calling side communication terminal terminates operation, processing for cancelling the non-real time call in the call reception may be performed.

The non-real time call state notifying signal may not be sent using a method in which it is spontaneously by the calling side communication apparatus. For example, non-real time call receiving unit 102 may poll the calling side communication apparatus with a regular period of time, and the non-real time call sending unit 101 may send a non-real time call state notifying signal as a response thereto. In such case, if the calling side communication apparatus does not receive a non-real time call state polling signal with a regular period of time while the non-real time call continues, the calling side communication apparatus may determined that the called side notifying apparatus terminates operation, and may send a non-real time call starting signal again.

The non-real time call receiving unit 102 may reply (send) a non-real time start reception signal, as a signal for notifying the reception of the signal, in reply to the non-real time call starting signal.

In the called side processing for achieving the non-real time call, the non-real time call responding unit 103 performs processing for sending a response. For example, when the non-real time call responding unit 103 receives a response operation which the user performs by selecting one of non-real time calls from a list of non-real time calls in the call reception state, the non-real time call responding unit 103 establishes a telephone call between the telephone communication unit 104 of the calling side communication apparatus and the telephone communication unit 104 of the called side communication apparatus, by commanding the telephone communication unit 104 to call back the calling side communication apparatus 100A. It should be noted that the non-real time call responding unit 103 may notify the non-real time call receiving unit 102 that the response has been sent. Upon receiving the notification, the non-real time call receiving unit 102 may delete information about the real time call in question from the receiving call list and may display a message indicating a completion of response.

It should be noted that a non-real time call response signal indicating that the called user has responded to the request of the telephone call by means of the non-real time call may be sent to the calling side communication apparatus of the non-real time call, and then, a telephone call may be started under the call control of the non-real time call sending unit 101 of the calling side communication apparatus 100A having received the non-real time call response signal. At this occasion, the calling side communication apparatus 100A may check with the user (in this case, calling person) as to whether a telephone call can be actually started.

It should be noted that the response operation may be executed by, for example, pressing a button in a GUI, making a selection in a command menu, and pressing a hardware key.

The telephone communication unit 104 establishes a voice telephone call between the calling side communication apparatus and the called side communication apparatus in accordance with a command given by the non-real time call sending unit 101 or the non-real time call responding unit 103.

In the present embodiment, the non-real time call sending unit 101 and the telephone communication unit 104 are achieved using, for example, a processor unit operating according to a program such as a CPU provided in the calling side communication apparatus 100A, and a communication unit for executing communication with another communication apparatus. On the other hand, the non-real time call receiving unit 102, the non-real time call responding unit 103, and the telephone communication unit 104 are achieved using, for example, a processor unit operating according to a program such as a CPU provided in the called side communication apparatus 100B, and a communication unit for executing communication with another communication apparatus. It should be noted that the function for holding data is achieved using a storage device such as various kinds of memories.

FIG. 2 is an explanatory diagram illustrating an example of a non-real time call sending window 200 displayed on a softphone GUI with which the non-real time call sending unit 101 accepts sending of a non-real time call from a user. The non-real time call sending window 200 as illustrated in FIG. 2 includes an input field 201 for the destination of the called side and a send button 205 for executing sending process when it is pressed. The non-real time call sending window 200 as illustrated in FIG. 2 also includes, as additional information, a title of the topic input field 202, an outline of the topic input field 203, and an expiration date/time of a non-real time call input field 204. The non-real time call sending unit 101 may accept the sending of the non-real time call by displaying such window to the user.

Figures 3, 4:
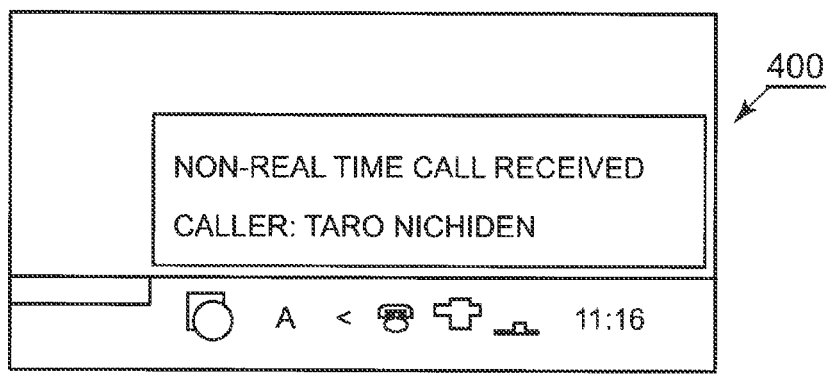
FIG. 3 is an explanatory diagram illustrating an example of a GUI displaying receiving call information about a non-real time call.
FIG. 4 is an explanatory diagram illustrating an example of a GUI notifying a receiving call of a non-real time call.

FIG. 3 is an explanatory diagram illustrating an example of a non-real time call receiving call window 300 displayed on the softphone GUI with which the non-real time call receiving unit 102 notifies the user of the current state of receiving call. The non-real time call receiving call window 300 as illustrated in FIG. 3 includes a list 301 for displaying a list of receiving non-real time calls and a response button 303. In the list 301, for example, each piece of information attached to the non-real time call starting signal (in this example, each piece of information which is input by the other party with the non-real time call sending window 200) and information indicating valid/invalid are displayed as column items.

Information about a new receiving non-real time call is preferably decorated with a highlight so as to attract attention (see line 302 in the figure). In the present example, the called side communication apparatus currently has three effective receiving non-real time calls, and among them, a receiving call from a calling person "Taro NICHIDEN" is displayed with a highlight because the receiving call from the calling person "Taro NICHIDEN" is new. The title of the receiving call is "schedule of regular meeting", and the expiration date/time is "17:30". When the response button 303 is pressed by the user, the non-real time call responding unit 103 responds to the non-real time call selected from among the list 301.

FIG. 4 illustrates an example of notification when the non-real time call receiving unit 102 receives a non-real time call. In the example as illustrated in FIG. 4, a notification toaster 400 (a temporary pop-up window) is displayed at an end of the screen in which the softphone GUI is displayed. The notification toaster 400 is modeless, which does not bother operation performed by the called person because the notification toaster 400 is hidden after a certain period of time passes. For example, the notification toaster 400 may include a message indicating a new receiving call and a message indicating information of a calling person. In the example as illustrated in FIG. 4, the message notifies the user that there was a receiving non-real time call from the calling person "Taro NICHIDEN". When the non-real time call receiving call window 300 is hidden, and the user points the notification toaster 400 with a mouse and the like, operation may be performed to display the non-real time call receiving call window 300.

Figure 5:
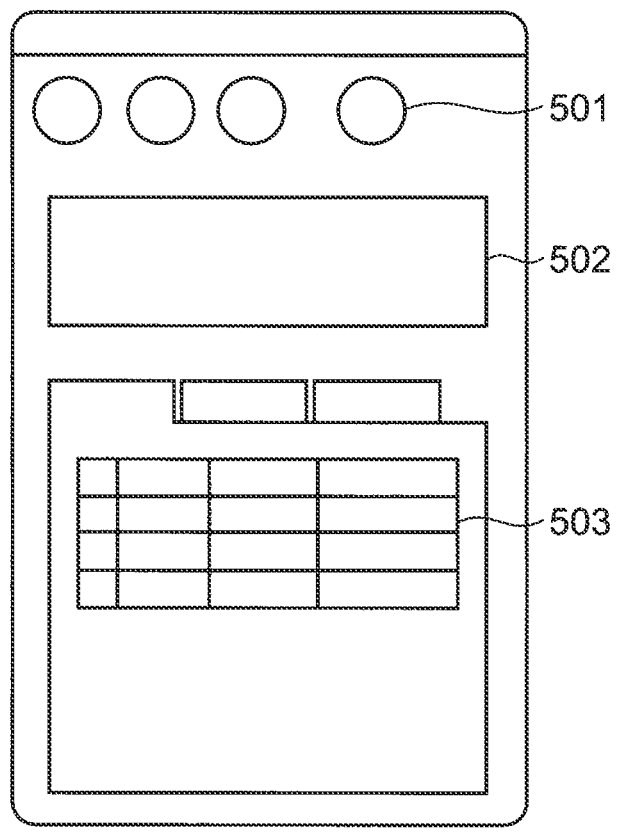
FIG. 5 is an explanatory diagram illustrating an example of a main GUI of the first embodiment.

Subsequently, an example of operation of communication apparatuses by a calling user and a called user up to the start of a telephone call will be explained step by step. FIG. 5 is an explanatory diagram illustrating an example of a main GUI of a softphone. For example, FIG. 5 shows a softphone window 500 displayed as a main screen for the softphone of both of the calling side and the called side. The softphone window 500 includes a button group 501 for executing each of telephone communication functions such as making a call, receiving a call, holding a call, and transferring a call, a message panel 502 for mainly displaying messages for notification, and a display panel 503 for displaying various kinds of other information.

The button group 501 includes a button for making a non-real time call, and when this button is pressed down, the non-real time call sending window 200 as shown in FIG. 2 is displayed. The display panel 503 displays a list concerning the other parties of telephone call such as an address book and a telephone call history, each of which is switched by a tab.

Information displayed in the display panel 503 includes a list of receiving non-real time calls and a list of outgoing non-real time calls.

First, the calling user presses down a non-real time call send button in the button group 501 of the softphone window 500 of FIG. 5 with the calling side communication apparatus 100A in order to make a non-real time call, so that the non-real time call sending window 200 as shown in FIG. 2 is displayed. In this case, the non-real time call sending unit 101 detects the non-real time call send button pressed-down, and then, the non-real time call sending window 200 is displayed.

In the displayed non-real time call sending window 200, for example, the calling user inputs a telephone number "1234-5678" into the "destination", and inputs the title of topic "schedule of regular meeting" into the "title". In this example, the "outline" is left blank, and the "expiration date/time" is set to "17:30, March 2" of the day when the non-real time call is made. After the user inputs the above, the user presses the send button 205. The non-real time call sending unit 101 detects the send button 205 pressed-down, and makes a non-real time call on the basis of the telephone number which is input to the "destination". More specifically, a non-real time call starting signal is sent to the called side communication apparatus 100B indicated by the destination telephone number. When the call has been made, the non-real time call sending unit 101 displays, on the softphone window 500, a message indicating that the call has been made.

When the called side communication apparatus 100B receives the non-real time call starting signal, the non-real time call receiving unit 102 recognizes a new receiving non-real time call, and the information is added to and displayed in a receiving non-real time call list 301 in the softphone window 500. In the example as illustrated in FIG. 3, a receiving call 302 is a new receiving non-real time call that has been received this time. At the same time in addition to the receiving call list, the non-real time call receiving unit 102 displays the notification toaster 400 as illustrated in FIG. 4 at a lower portion of the screen of the called side communication apparatus 100B, and notifies the user that a new receiving non-real time call has been received.

In the present example, it is assumed that, although the called user sees the notification toaster 400, the called user is too busy to take a telephone call because the called user is doing work at this moment, and the called user continues the work without answering the call. Then, for example, 30 minutes later, the called user becomes available to make a telephone call, and the called user selects the previous receiving call 302 from the receiving non-real time call list 301 as illustrated in FIG. 3 and presses down the response button 303 in order to perform response operation. Accordingly, the non-real time call responding unit 103 causes the telephone communication unit 104 to call back the calling side. At this occasion, the sent sending signal may be attached with information indicating that this call is a callback made as a response by means of the non-real time call. Then, the calling side communication apparatus 100A displays a dialogue and the like indicating that the called side has responded, and after the user performs confirmation operation, a telephone call is started.

Figure 6:
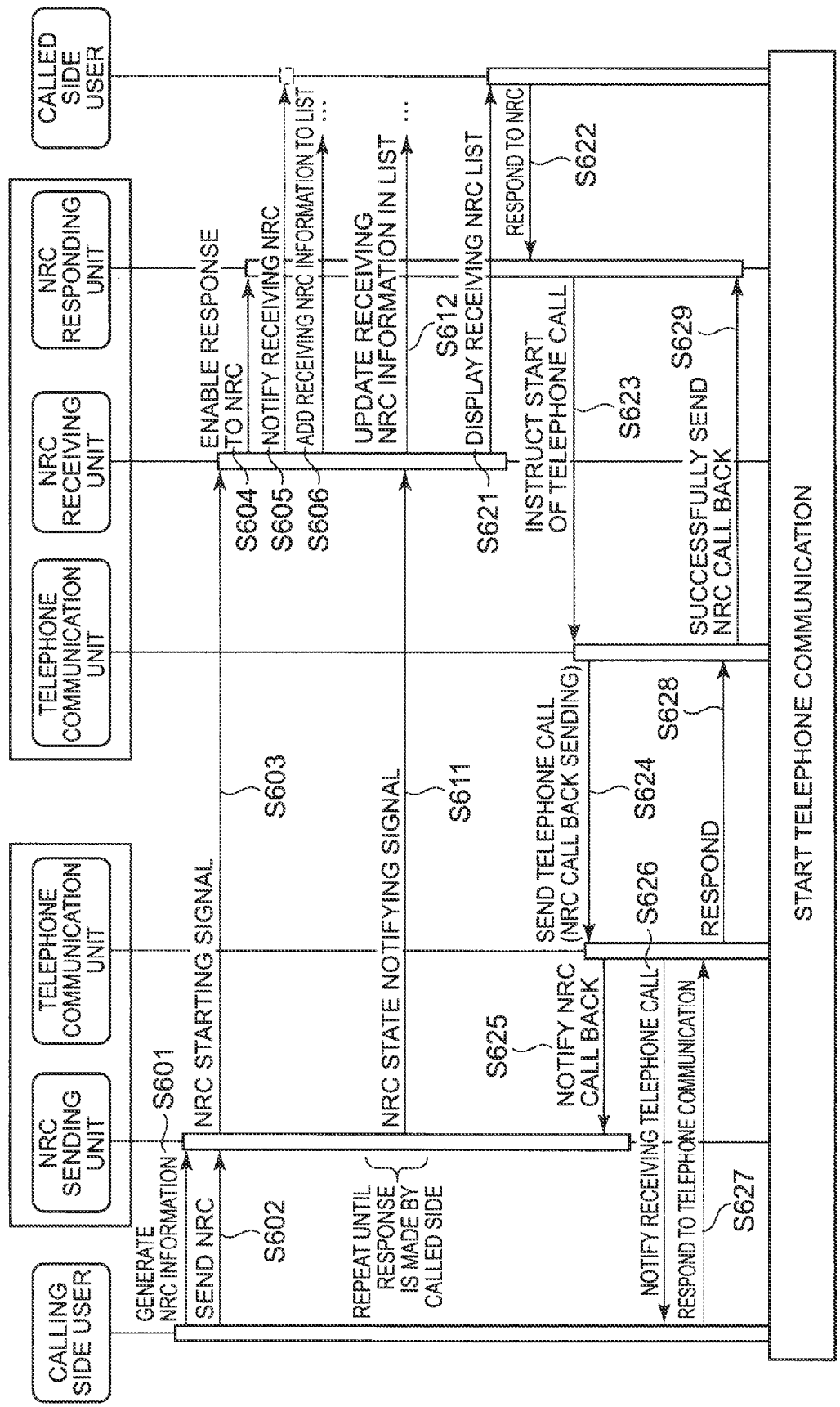
FIG. 6 is a sequence diagram illustrating an example of operation of the first embodiment.
Figure 7:
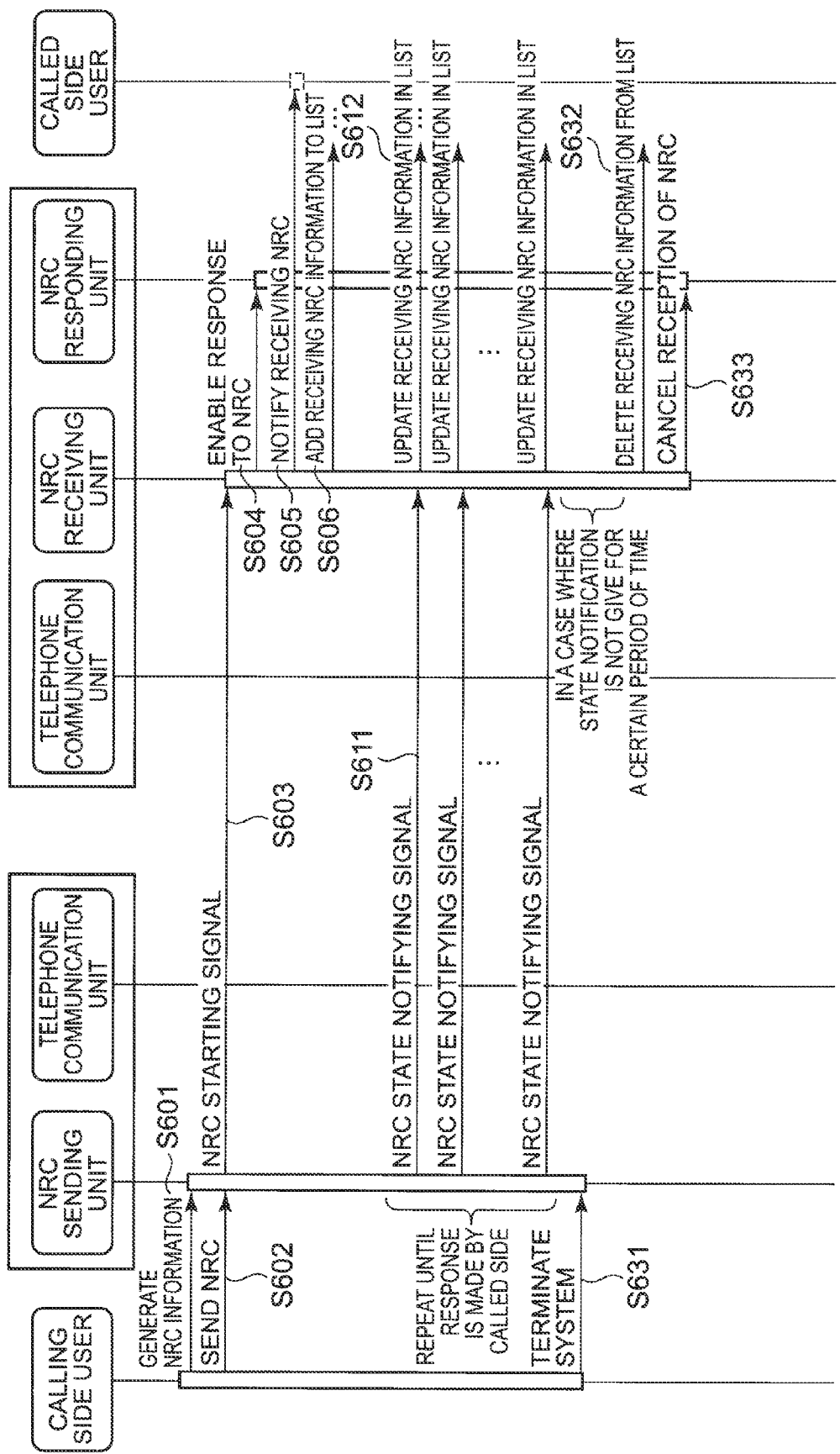
FIG. 7 is a sequence diagram illustrating an example of operation of the first embodiment.
Figure 8:
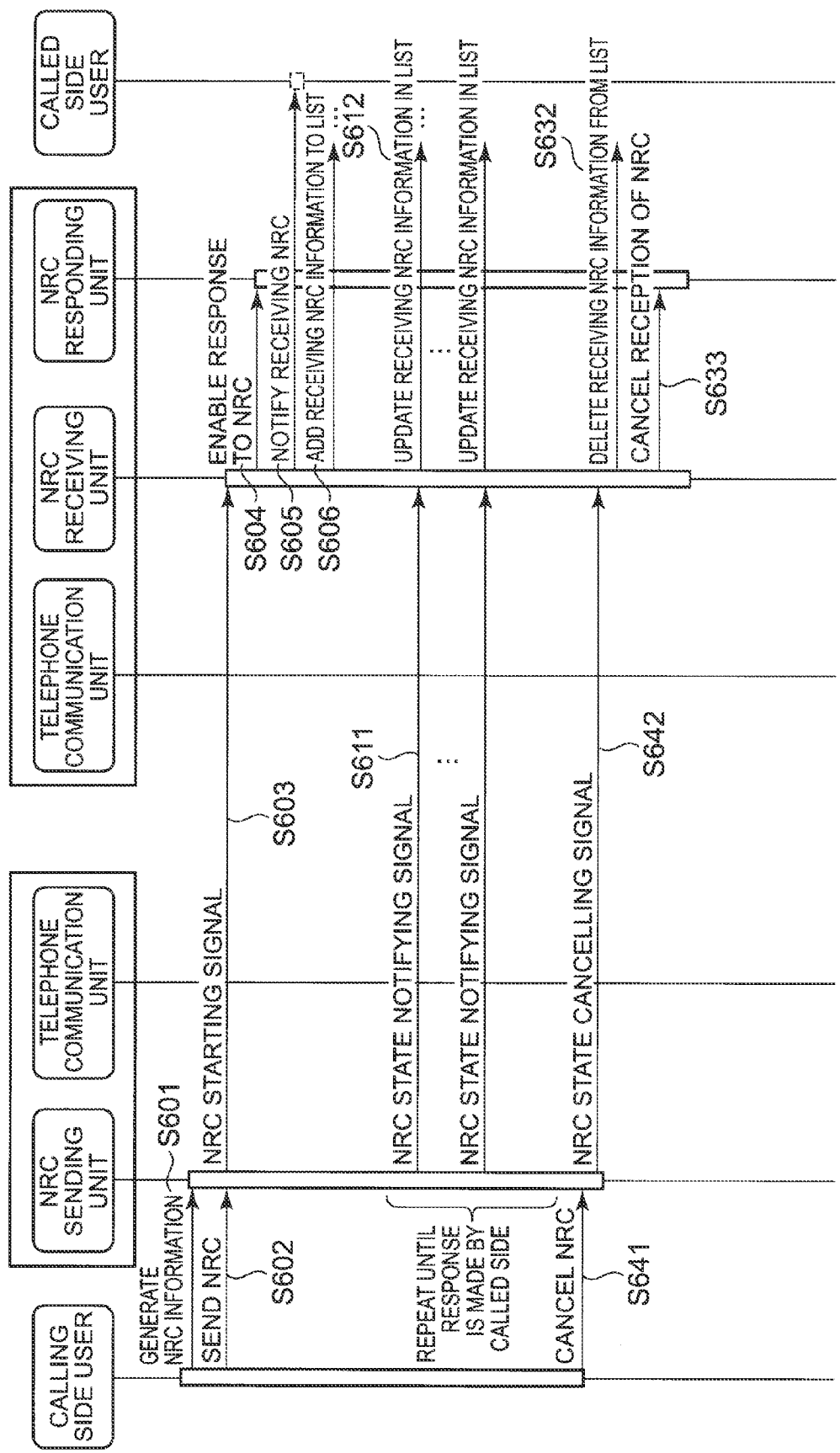
FIG. 8 is a sequence diagram illustrating an example of operation of the first embodiment.

FIGS. 6 to 8 are sequence diagrams illustrating an example of operation of the present embodiment. In FIGS. 6 to 8, "NRC" is used as an abbreviation of non-real time call.

First, the sequence as illustrated in FIG. 6 will be explained. The example as illustrated in FIG. 6 is an example of a normal sequence up to the start of a telephone call. As illustrated in FIG. 6, when the calling user generates information for sending of the non-real time call and performs sending operation of the non-real time call (S601,S602), the non-real time call sending unit 101 of the calling side communication apparatus 100A sends a non-real time call starting signal to the called side communication apparatus 100B (S603).

The non-real time call receiving unit 102 of the called side communication apparatus 100B having received the non-real time call starting signal notifies the non-real time call responding unit 103 of a receiving call event, enables response to the non-real time call (S604), and notifies the user of the receiving non-real time call (S605). At this occasion, for example, like the notification toaster 400, the notification is given so as not to bother user operation. In addition, the non-real time call receiving unit 102 adds information about the receiving non-real time call (hereinafter, receiving call information) to the receiving call list so that it can be displayed at any time in response to user operation (S606).

On the other hand, while the non-real time call sending unit 101 continues the non-real time call, the calling side communication apparatus 100A sends a non-real time call state notifying signal to the called side communication apparatus 100B with predetermined timing (S611). In the called side communication apparatus 100B having received the non-real time call state notifying signal, the non-real time call receiving unit 102 updates the receiving call information of the non-real time call, on the basis of information included in the received non-real time call state notifying signal (information indicating whether the calling person is available to communicate or not) (S612). For example, the valid/invalid states may be switched in accordance with the state of the calling person. It should be noted that the non-real time call sending unit 101 repeatedly sends such non-real time call state notifying signal until a response is received from the called side.

At this occasion, it is assumed that, in the called side communication apparatus 100B, the user displays the receiving call information about non-real time calls, and performs response operation to anyone of them (S621, S622). The non-real time call responding unit 103 receives the user's response operation, and commands the telephone communication unit 104 to start a telephone communication for the specified non-real time call (S623). At this occasion, the telephone communication unit 104 may also be notified that this is a call back of the non-real time call.

The telephone communication unit 104, which receives the instruct starting the telephone communication, makes a telephone call to the specified party (in the present example, the calling side communication apparatus of the specified non-real time call) (S624). It should be noted that this sending signal may also be attached with information indicating that this is a call back of the non-real time call.

In the calling side communication apparatus 100A, the telephone communication unit 104 receives the sending signal of the telephone communication, and when the sending signal of the telephone communication is attached with the information indicating that the signal is the call back of the non-real time call, the non-real time call sending unit 101 is notified to that effect (the call back of the non-real time call has been received) (S625), and the user is notified of a receiving telephone communication (S626). When the user responds to the telephone communication (S627), the telephone communication unit 104 sends a telephone call starting signal (response signal) to the source communication apparatus (in this case, the called side communication apparatus 100B that received the non-real time call) (S628), and makes various kinds of settings required to start a telephone call.

On the other hand, in the called side communication apparatus 100B, the telephone communication unit 104 receives the response signal, and likewise, various kinds of settings required to start a telephone communication are made. As described above, the telephone communication is started between the calling side communication apparatus 100A and the called side communication apparatus 100B. When the telephone communication unit 104 of the called side communication apparatus 100B receives a response signal in reply to the sending signal of the telephone call which is the call back of the non-real time call, the telephone communication unit 104 of the called side communication apparatus 100B may notify the non-real time call responding unit 102 that the call back of the non-real time call has been successfully made (S629). For example, upon receiving this notification, the non-real time call responding unit 102 may delete the receiving call information about the non-real time call from the receiving call list.

As described above, the non-real time call continues to be virtually established from the calling side, and the called side can respond thereto at any time convenient for the called side.

In this case, upon receiving the response signal from the called user, the called side communication apparatus 100B attempts to make a telephone call by means of the response of the non-real time call, but the called side communication apparatus 100B may fail to establish the telephone call because, for example, the calling user is absent. In such case, then, the non-real time call sending unit 101 of the called side communication apparatus may make a non-real time call in the opposite direction, i.e., from the called side to the calling side. Like the called side communication apparatus, the non-real time call receiving unit 102 of the calling side communication apparatus 100A may add receiving call information based on the non-real time call made by the called side to the receiving call list 301 of the non-real time call receiving call window 300 as illustrated in FIG. 3. When the calling user becomes available, the calling user responds to this receiving call, whereby an attempt to make a telephone call is started.

Subsequently, the sequence as illustrated in FIG. 7 will be explained. The example as illustrated in FIG. 7 is an example of a sequence during calling side abnormal termination. It should be noted that operation in steps up to S612 of FIG. 7 is the same as that of FIG. 6, and therefore, description thereabout is omitted. In the example as illustrated in FIG. 7, the calling side communication apparatus 100A is terminated while the calling user continues the non-real time call after S612 (S631). When the calling user terminates the calling side communication apparatus 100A, the non-real time call sending unit 101 is terminated at that moment, and accordingly, the subsequent sending of the non-real time call state notifying signal is stopped.

In the called side communication apparatus 100B, when the non-real time call receiving unit 102 does not receive the non-real time call state notifying signal for a certain period of time, processing is performed to cancel the reception of the non-real time call. In the present example, the receiving call information of the non-real time call is deleted from the list (S632), and the non-real time call responding unit 103 is notified that the reception of the non-real time call is cancelled (S633), and thereby the processing concerning the non-real time call is terminated. The non-real time call responding unit 103 having received the notification cancels the response reception state, and terminates the processing concerning the non-real time call. When the non-real time call receiving unit 102 does not receive the non-real time call state notification for a certain period of time, the non-real time call is once invalid, and when the non-real time call receiving unit 102 still does not receive the non-real time call state notification for some more period of time, processing may be performed to cancel the non-real time call.

Subsequently, the sequence as illustrated in FIG. 8 will be explained. The example as illustrated in FIG. 8 is an example of a sequence where the calling user performs operation to stop the non-real time call. It should be noted that operation in steps up to S612 of FIG. 8 is the same as that of FIG. 6, and therefore, description thereabout is omitted. In the example as illustrated in FIG. 8, the calling user performs operation to cancel the non-real time call after S612 (S641). The calling user performs operation to cancel the non-real time call, the non-real time call sending unit 101 having received the operation performs operation to cancel the sending of the non-real time call. In the present example, the non-real time call cancelling signal is sent to the called side communication apparatus 100B (S641), whereby processing concerning the non-real time call is terminated.

In the called side communication apparatus 100B, the non-real time call receiving unit 102 receives the non-real time call cancelling signal, and performs processing to cancel the reception of the non-real time call on the basis of the received non-real time call cancelling signal. It should be noted that the processing of cancelling the reception of the non-real time call may be the same as that of the example as illustrated in FIG. 7.

As described above, according to the present embodiment, the calling user does not have to care much about the convenience of the called user, and the called user does not have to immediately answer the receiving call when, for example, the called user is too busy or when the called user has to make a preparation before taking a telephone call, and the called user can respond at any time convenient for the called user. This allows establishment of a telephone call while reducing the psychological burden of the calling user and the called user. The reason for the above is that the sending of the request of telephone call does not entail forcible ringing, and the request of telephone call is continuously made (for example, for every several hours). In addition, while the request of telephone call continues, the calling user's presence information (for example, information indicating whether the calling user is present or absent) is notified to the called user, and therefore, even if the called user is unable to answer the receiving call immediately, the called user can respond with appropriate timing while the called user checks the state as to whether the calling user is ready to take a telephone call or not.

In addition, as compared with a case where the state of a user is publicly available to other users at all times, the psychological burden of the calling user, for example, feeling of being watched, can be reduced. The called user also does not feel that the called user is watching the calling user, and therefore, similar psychological burden of the called user can be reduced.

In the example as illustrated in FIG. 1, the non-real time call sending unit 101 sends the non-real time call state notifying signal, and the non-real time call receiving unit 102 receives the non-real time call state notifying signal. Alternatively, a non-real time call state notification sending unit for sending a non-real time call state notifying signal and a non-real time call state notification receiving unit may be provided separately.

Figure 9:
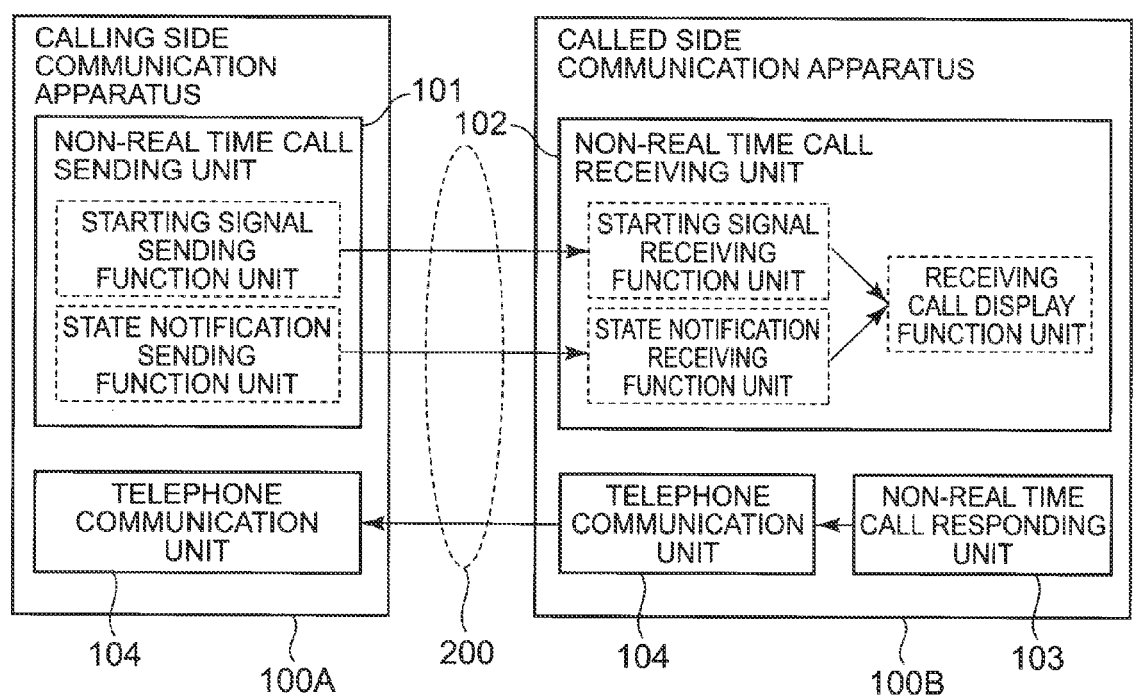
FIG. 9 is a block diagram illustrating another example of configuration of a communication apparatus according to the first embodiment.

For example, as illustrated in FIG. 9, a starting signal sending function unit and a state notification sending function unit may be configured to be included in the non-real time call sending unit 101. A starting signal receiving function unit, a state notification receiving function unit, and a receiving call display function unit displaying receiving calls to a user on the basis of the received starting signal and the received state notifying signal may be configured to be included in the non-real time call receiving unit 102. Division into functional blocks and configurations are not limited to the examples shown above.

Second Embodiment

Figure 10:
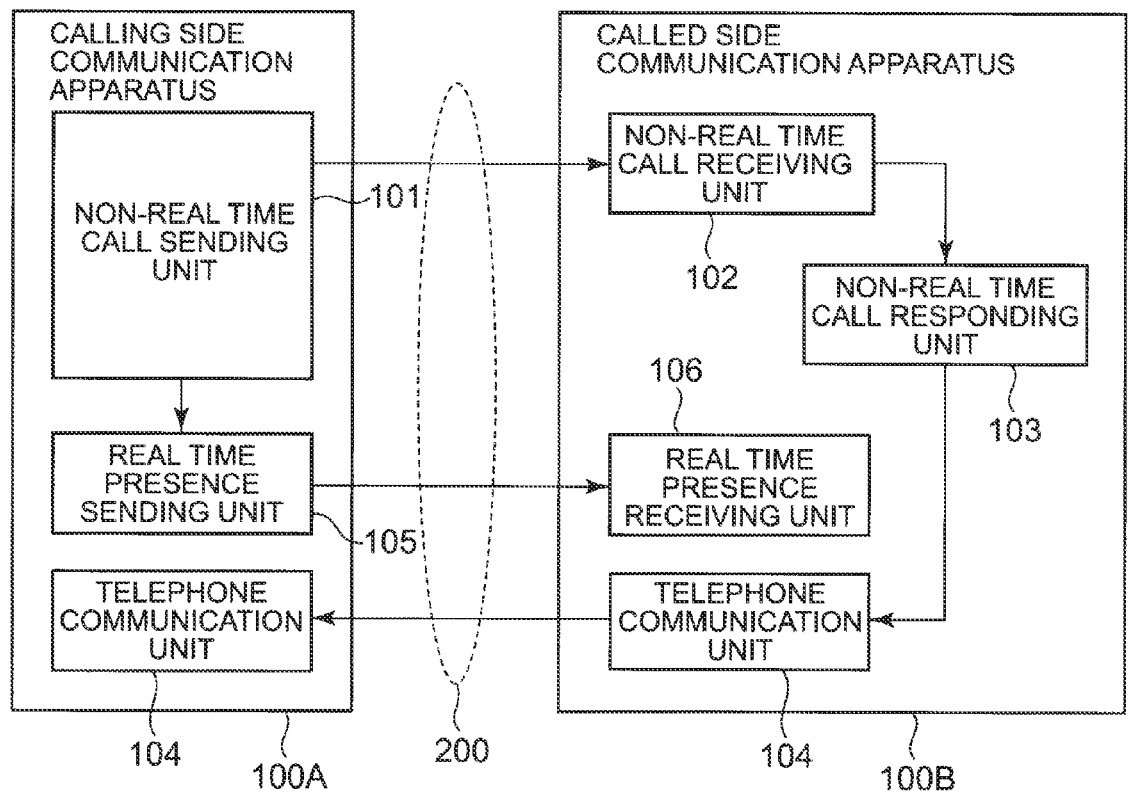
FIG. 10 is a block diagram illustrating an example of schematic configuration of a communication apparatus according to a second embodiment.

Subsequently, a second embodiment of the present invention will be explained. FIG. 10 is a block diagram illustrating an example of schematic configuration of a communication apparatus according to the second embodiment. The example as illustrated in FIG. 10 is different from the configuration of the first embodiment as illustrated in FIG. 1 in that the calling side communication apparatus 100A further includes a real time presence sending unit 105. In addition, the example as illustrated in FIG. 10 is different in that the called side communication apparatus 100B further includes a real time presence receiving unit 106.

With regard to a non-real time call that is currently being sent, the real time presence sending unit 105 obtains detailed presence information about a calling side (hereinafter referred to as real time presence) with predetermined timing, in accordance with a command given by the non-real time call sending unit 101, and sends the real time presence to the called side communication apparatus 100B. For example, instead of the non-real time call sending unit 101, the real time presence sending unit 105 may send the real time presence by sending a non-real time call state notifying signal to which the real time presence is added. The real time presence sending unit 105 may start or end the sending of the non-real time call state notifying signal in accordance with, for example, a real time presence sending start/end request from the non-real time call sending unit 101. In this manner, while the non-real time call continues, the real time presence sending unit 105 keeps on sending the real time presence to the called side.

In general, several states such as "present", "absent", and "busy" can be defined as presence information, and the states are switched manually or automatically. For example, a method for switching the state from "present" to "absent" when no operation is performed with the apparatus for a certain period of time is generally used as the method for automatically switching the state. In this case, even if a user is actually away from his/her desk, the state may be falsely recognized as "present" when the time in which no operation is performed has not yet attained a threshold value.

In contrast, the real time presence treated in the present embodiment defines the state of the apparatus or the state of the user of the apparatus in such a manner that it is expressed in more details. More specifically, presence information indicating the possibility of communication on the basis of a more detailed value is defined as the real time presence, as compared with presence information indicating whether a communication can be made on the basis of independently labeled states such as "present" and "absent". More specifically, the real time presence is information expressing the state of the apparatus or the state of the user of the apparatus using the degree of certainty that the user is ready to make a telephone call. Examples of values of real time presence include an elapsed time and an integer (continuous value) in a certain range.

While the reception of the non-real time call continues, the real time presence receiving unit 106 receives the real time presence sent from the real time presence sending unit 105, and displays the real time presence as receiving call information as necessary. For example, instead of the non-real time call receiving unit 102, the real time presence receiving unit 106 may receive the real time presence by receiving the non-real time call state notifying signal to which the real time presence is added. For example, the real time presence receiving unit 106 may start or end the reception of the non-real time call state notifying signal, in accordance with a real time presence reception start/end request given by the non-real time call receiving unit 102.

On the other hand, the real time presence receiving unit 106 updates receiving call information of a non-real time call on the basis of the contents of the received real time presence. When the real time presence receiving unit 106 receives the non-real time call state notifying signal instead of the non-real time call receiving unit 102, the real time presence receiving unit 106 also performs processing of determining cancellation of the reception in accordance with the reception interval, in place of the non-real time call receiving unit 102.

Figure 11:
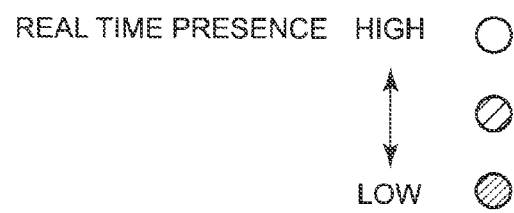
FIG. 11 is an explanatory diagram illustrating an example of a method for expressing real time presence.

An example of a method for displaying the real time presence includes expression based on the brightness of light. FIG. 11 is an example of expression based on the brightness of light of an analogue lamp on a GUI. The example as illustrated in FIG. 11 includes three analogue lamps. In the example as illustrated in FIG. 11, the analogue lamps are displayed such that the higher the value of the real time presence is, the brighter the brightness of the light becomes, and the lower the value of the real time presence is, the darker the brightness of the light becomes. This brightness of the light corresponds to the degree of certainty that the calling side may be able to communicate as indicated by the real time presence. The brightest analogue lamp 7 represents the highest degree of certainty, and the darkest analogue lamp 703 represents the lowest degree of certainty. It is to be understood that the method for expressing the real time presence is not limited thereto, and the method for expressing the real time presence may be anything as long as a continuous value or multiple values can be expressed such as an indication by a graph, a numerical expression, a display using an LED, and an expression using a sound.

Subsequently, an example of operation of communication apparatuses by a calling user and a called user up to the start of a telephone call using sending and reception of real time presence will be explained step by step. First, operation by the calling user with the calling side communication apparatus 100A will be explained. In the example illustrated below, the real time presence sending unit 105 uses, as a value of real time presence, elapsed seconds that have passed since the user manipulated the communication apparatus last time.

The calling user is not required to do anything about the sending of the real time presence, and therefore, like the first embodiment, the calling user makes a non-real time call using the GUI as illustrated in FIGS. 5 and 2. At the same time as this sending of the call, the real time presence sending unit 105 of the calling side communication apparatus 100A keeps on sending the real time presence (in this case, elapsed seconds that have passed since the calling user manipulated the calling side communication apparatus 100A last time) to the real time presence receiving unit 106 of the called side communication apparatus 100B at a regular interval.

Figure 12:
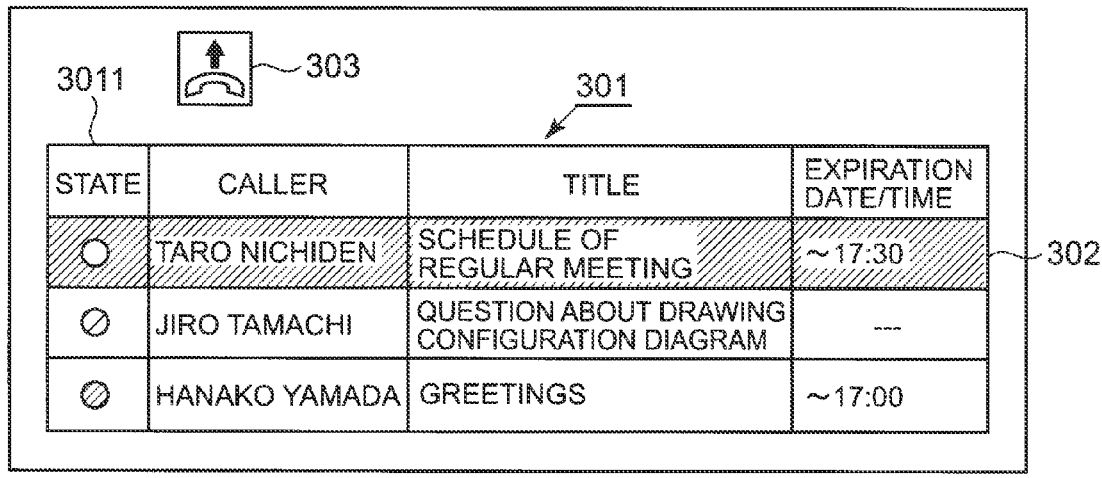
FIG. 12 is an explanatory diagram illustrating an example of a GUI displaying receiving call information about non-real time calls according to the second embodiment.

Subsequently, operation by the called user with the called side communication apparatus 100B will be explained. FIG. 12 is an explanatory diagram illustrating an example of a GUI displaying receiving call information about non-real time calls according to the present embodiment. The example as illustrated in FIG. 12 is an example of a GUI displaying the receiving call information about the non-real time calls with real time presences. It should be noted that the same elements as those of FIG. 3 are denoted with the same reference numerals, and description thereabout is omitted.

Like the first embodiment, when the non-real time call receiving unit 102 of the called side communication apparatus 100B receives a non-real time call starting signal, the non-real time call receiving unit 102 of the called side communication apparatus 100B recognizes a receiving non-real time call, and adds receiving call information to the receiving call list 301. In the present example, in the column of a state 3011 in the receiving call list 301, real time presence sent from the calling side is expressed using an analogue lamp. It is assumed that the non-real time call receiving unit 102 displays, with a predetermined indication, the state 3011 at the time of reception of a call, in such a manner that the degree of certainty concerning the chance that the calling user makes a communication is the highest value.

Subsequently, when the non-real time call state notification including the real time presence is sent from the calling side communication apparatus 100A, the real time presence receiving unit 106 of the called side communication apparatus 100B receives the non-real time call state notification. The real time presence receiving unit 106 updates the state 3011 of the corresponding receiving call information, on the basis of the value of the real time presence included in the received non-real time call state notification.

In the example as illustrated in FIG. 12, the receiving call from "Taro NICHIDEN" in the first line has the highest value of real time presence, and the receiving call from "Hanako YAMADA" in the third line has the lowest value of real time presence. In the present example, the value of real time presence is represented as elapsed seconds that have passed since the calling user manipulated calling side communication apparatus 100A last time, and therefore, the less the elapsed seconds are, the brighter the light of the analogue lamp becomes. In other words, when the elapsed time is 0 second, the brightness is the highest. Since there is a limit in the darkness of the analogue lamp, a threshold value (for example, 1200 seconds) is set for the elapsed seconds. When the elapsed seconds are equal to or more than this threshold value, the lowest brightness is used.

As described above, in the present embodiment, while the non-real time call continues, detailed (more realistic) present information such as information about the degree of certainty concerning the chance that the calling user makes a communication is continuously sent to the called side with a regular interval of time. Therefore, the called user can find, in details, the state as to whether the calling user can communicate or not. More specifically, the called user can find in advance how high the degree of certainty is that a telephone call can be established if the called user answers the call. This can further reduce the failure of making a telephone call due to the absence of the calling user. For example, the called user may not answer the call when the light of the analogue lamp is dark, and the called user may answer the call after the light becomes brighter, so that it is less likely for the called user to fail in making the telephone call due to the absence of the calling user.

In this method of expressing the real time presence, the real time presence is not expressed using a clear numerical value, but is expressed in a manner fuzzy to persons such as the brightness of the light or the color. Therefore, this can further reduce the psychological burden imposed on the calling user, for example, the calling user feels as if the calling user is watched, and the psychological burden imposed on the called user, for example, the called user feels as if the called user is watching the calling user.

In this case, the called user answers the non-real time call to attempt making a telephone call, but when a telephone call cannot be established due to, for example, the absence of the calling user, the non-real time call sending unit 101 provided in the called side communication apparatus 100B may make a non-real time call in the opposite direction, i.e., from the called side communication apparatus 100B to the calling side communication apparatus 100A, like the first embodiment. In this case, the real time presence sending unit 105 provided in the called side communication apparatus 100B sends real time presence (the degree of certainty concerning the chance that the called user makes a communication) of the calling side (in this case, the called user who was called originally) to the communication apparatus of the other party (in this case, the calling side communication apparatus 100A) as explained above.

In the example as illustrated in FIG. 10, the calling side has the real time presence sending unit 105 which is provided separately from the non-real time call sending unit 101, and the called side has the real time presence receiving unit 106 which is provided separately from the non-real time call receiving unit 102. Alternatively, the real time presence sending unit 105 may be implemented as a function of the non-real time call sending unit 101 (or the non-real time call state notification sending unit), and the real time presence receiving unit 106 may be implemented as a function of the non-real time call receiving unit 102 (or the non-real time call state notification receiving unit).

Third Embodiment

Figure 13:
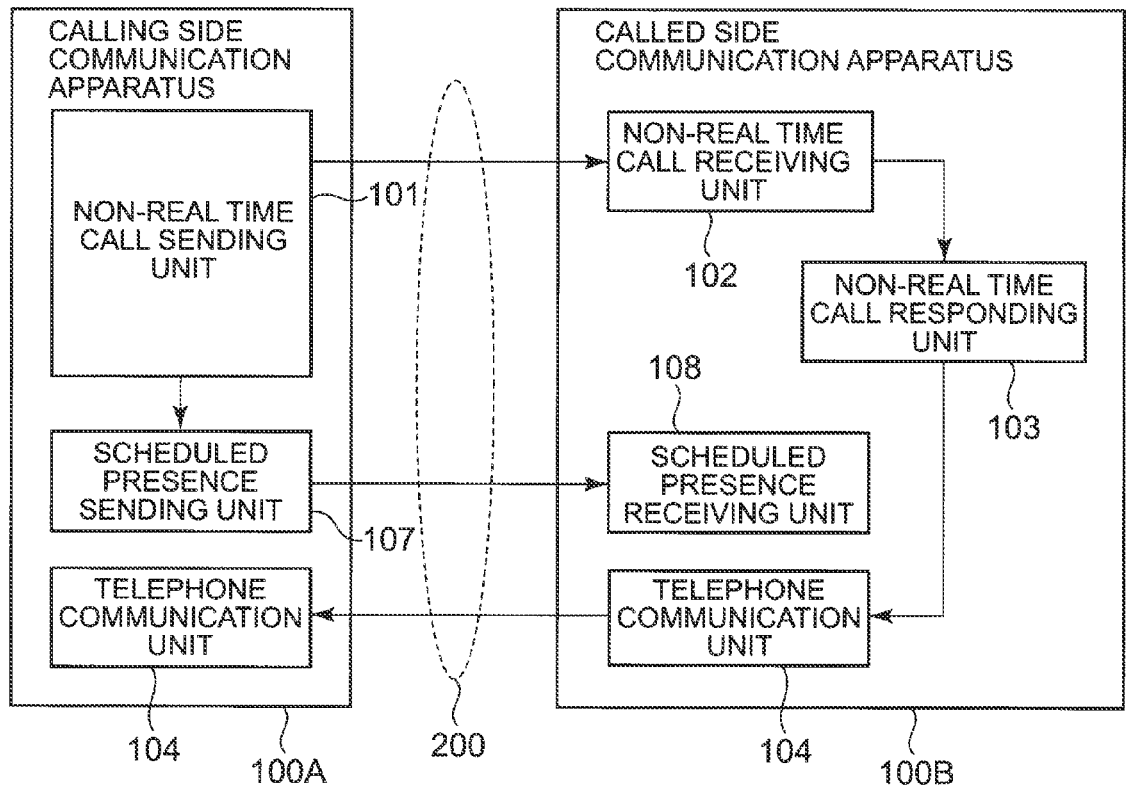
FIG. 13 is a block diagram illustrating an example of schematic configuration of a communication apparatus according to a third embodiment.

Subsequently, a third embodiment of the present invention will be explained. FIG. 13 is a block diagram illustrating an example of schematic configuration of a communication apparatus according to the third embodiment. The example as illustrated in FIG. 13 is different from the configuration of the first embodiment as illustrated in FIG. 1 in that the calling side communication apparatus 100A further includes a scheduled presence sending unit 107. In addition, the example as illustrated in FIG. 13 is different from the configuration of the first embodiment as illustrated in FIG. 1 in that the called side communication apparatus 100B further includes a scheduled presence receiving unit 108.

In accordance with a command given by the non-real time call sending unit 101, the scheduled presence sending unit 107 obtains user's scheduled presence information (hereinafter referred to as scheduled presence) and sends the scheduled presence to the called side communication apparatus 100B when a non-real time call is sent or while the non-real time call continues. For example, the scheduled presence may be made by extracting, from user's schedule information, a period of time in which the user is at his/her desk and a period of time in which the user is away from his/her desk after the time at which the non-real time call was sent, and the extracted period of times may be attached to the non-real time call starting signal, and may be sent as the scheduled presence information.

When there is change in the scheduled presence, the scheduled presence sending unit 107 may send the changed scheduled presence again. For example, when a notification of change of the schedule information is given, and it is determined that the contents has been changed in the scheduled presence, the changed scheduled presence may be sent again. Control may be performed as follows. When the non-real time call sending unit 101 sends the non-real time call state notifying signal, the update of the schedule information is checked, and when the scheduled presence is determined to have been changed, the changed scheduled presence may be added to the non-real time call state notifying signal and may be sent. The scheduled presence sending unit 107 may send not only the scheduled presence but also schedule information of the current date and time of the calling person (for example, a period of time in a certain range).

The scheduled presence is made such that presence information is associated with a period of time. Examples of presence information include "present", "absent", and "unknown". For example, the scheduled presence is associated such that the period of time "14:00 to 16:00" is "absent".

When the non-real time call is received or while the non-real time call continues, the scheduled presence receiving unit 108 receives the scheduled presence sent from the scheduled presence sending unit 107, and displays the scheduled presence as receiving call information as necessary. For example, the scheduled presence receiving unit 108 may receive scheduled presence included in the non-real time call starting signal from the non-real time call receiving unit 102. For example, it is possible to directly receive a scheduled presence notification signal which is defined separately. For example, when the non-real time call state notifying signal including the scheduled presence is directly received, or it is received by another processing unit, the scheduled presence may be received from the processing unit.

The scheduled presence receiving unit 108 updates the receiving call information of the non-real time call on the basis of the contents of the received scheduled presence. Then, the called user can check them with any timing. When the scheduled presence receiving unit 108 receives the non-real time call state notifying signal in place of the non-real time call receiving unit 102, the scheduled presence receiving unit 108 also performs, in place of the non-real time call receiving unit 102, processing of determining whether to cancel reception of call or not in accordance with the reception interval.

For example, the scheduled presence receiving unit 108 collates the current time with the received scheduled presence, and displays the corresponding presence information together with the received receiving non-real time call. A determination is made, based on the scheduled information, as to whether the calling person can make a telephone call or not in the current period of time. When the calling person is determined to be unable to communicate, processing may be performed to disable reception of the non-real time call, or when it is determined, based on the scheduled presence, that the calling person is ready to make a telephone call, processing may be performed to enable reception of the non-real time call.

When the scheduled presence receiving unit 108 receives schedule information corresponding to the current date and time of the calling person at the same time, the schedule information (detailed information, such as the place where the calling person is visiting) may be displayed together with the receiving call information.

Subsequently, an example of operation of communication apparatuses by a calling user and a called user up to the start of a telephone call using sending and reception of scheduled presence will be explained step by step. First, operation by the calling user with the calling side communication apparatus 100A will be explained. In the example shown below, it is assumed a scheduler for managing schedule information of the user of the apparatus is provided outside of the communication apparatus 100A. When a non-real time call is sent, the calling side communication apparatus 100A selects whether to send scheduled presence or not.

Figure 14:
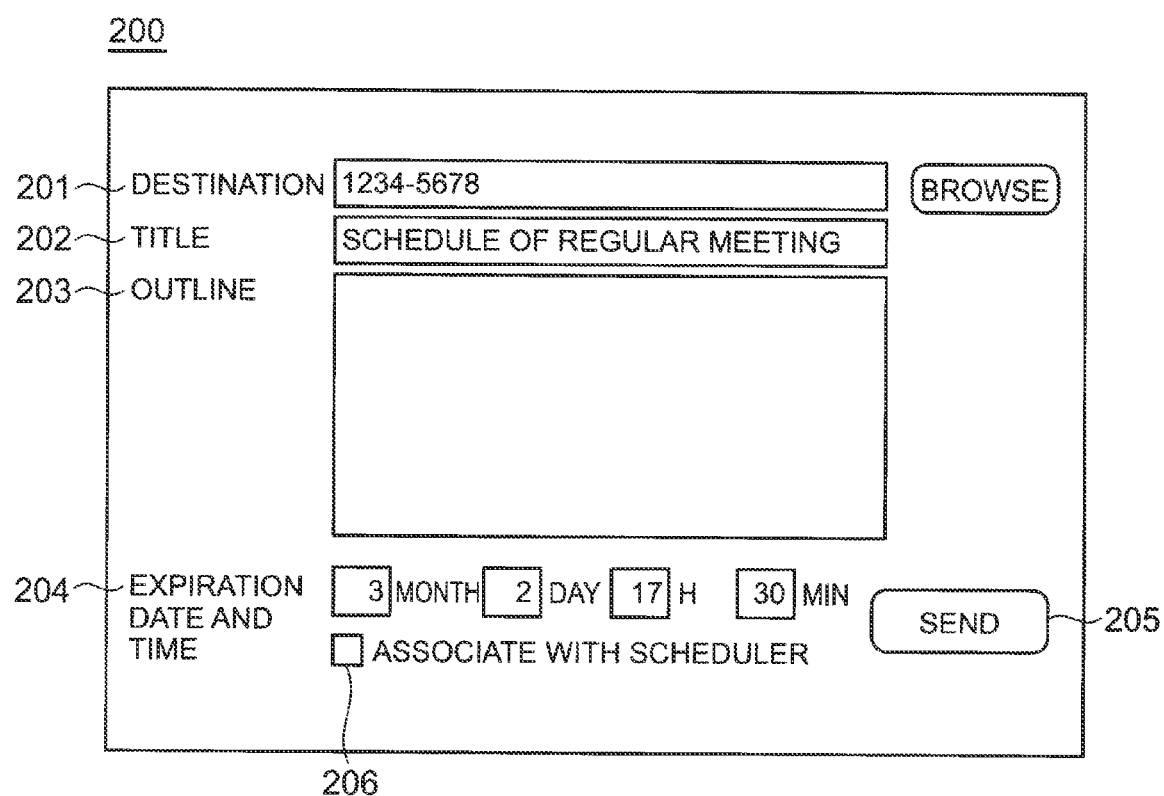
FIG. 14 is an explanatory diagram illustrating an example of a GUI displayed when making a non-real time call according to the third embodiment.

FIG. 14 is an explanatory diagram illustrating an example of a GUI displayed when making a non-real time call according to the present embodiment. In the example as illustrated in FIG. 14, the user checks an "associate with scheduler" checkbox 206 provided on the non-real time call sending window 200, and sends a non-real time call with sending of scheduled presence.

At the same time as this sending, the scheduled presence sending unit 107 of the calling side communication apparatus 100A sends the scheduled presence and the schedule of that day to the scheduled presence receiving unit 108 of the called side communication apparatus 100B.

Figure 15:
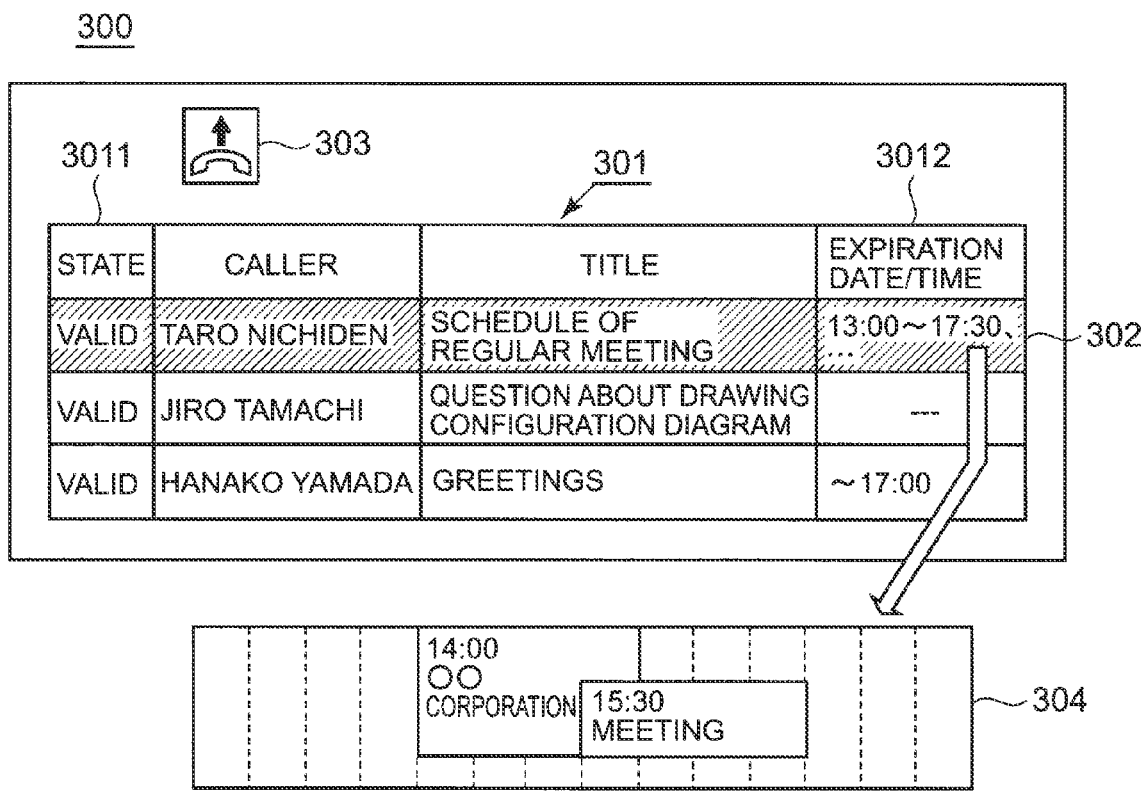
FIG. 15 is an explanatory diagram illustrating an example of a GUI displaying receiving call information about non-real time calls according to the third embodiment.

Subsequently, operation by the called user with the called side communication apparatus 100B will be explained. FIG. 15 is an explanatory diagram illustrating an example of a GUI displaying receiving call information about non-real time calls according to the present embodiment. The example as illustrated in FIG. 15 is an example of a GUI displaying the receiving call information about the non-real time calls with scheduled presence. It should be noted that the same elements as those of FIG. 3 are denoted with the same reference numerals, and description thereabout is omitted.

Like the first embodiment, when the non-real time call receiving unit 102 of the called side communication apparatus 100B receives a non-real time call starting signal, the non-real time call receiving unit 102 of the called side communication apparatus 100B recognizes a receiving non-real time call, and adds receiving call information to the receiving call list 301. At this occasion, in the column of a state 3011 in the receiving call list 301, the non-real time call receiving unit 102 displays a predetermined indication, in such a manner that the state of the reception is valid or the degree of certainty concerning the chance that the calling user makes a communication is the highest value. When the scheduled presence is added, the current time may be collated with the received scheduled presence, and the corresponding presence information may be displayed.

In the present example, in a column of a valid time 3012 of the receiving call list 301, periods of times indicated as "present" in the scheduled presence are enumerated and displayed. In addition, as further detailed information, the called user can check the schedule of the calling person with any timing. For example, when the column 3012 of the valid time is clicked, schedule information held in association with the receiving call list 301 may be displayed.

The receiving call information based on the scheduled presence may be displayed by the scheduled presence receiving unit 108. The same display method is also used when scheduled presence is sent separately. When the scheduled presence is updated and sent again, the display may be updated on the basis of the received scheduled presence.

As described above, the presence associated with the scheduler is sent, so as to prevent that the calling person fails to manually change the presence information, and this wrong presence information is sent to the called person. When the calling person does not disclose the schedule information to the public, only required portion of the schedule information of that day can be sent to the called person.

In the above embodiment, the scheduled presence sending unit 107 and the scheduled presence receiving unit 108 are added to the configuration of the first embodiment. Alternatively, the same units may be added to the configuration of the second embodiment, and operation can be performed. In such a case, the calling side communication apparatus 100A sends both of real time presence and scheduled presence. For example, the receiving side communication apparatus 100B may perform display method such as updating the state column 3011 of the receiving call list 301 on the basis of the real time presence and updating the expiration date/time column 3012 on the basis of the scheduled presence.

Like the second embodiment, the present embodiment may also be configured such that the scheduled presence sending unit 107 may be implemented as a function of the non-real time call sending unit 101 (or the non-real time call state notification sending unit), and the scheduled presence receiving unit 108 may be implemented as a function of the non-real time call receiving unit 102 (or the non-real time call state notification receiving unit).

Each of the non-real time call sending unit (or the starting signal sending function unit or the state notification sending function unit which are included therein), the non-real time call receiving unit (or the starting signal receiving function unit, the state notification receiving function unit, or the receiving call display function unit), the non-real time call responding unit, the telephone communication unit, the real time presence sending unit, the real time presence receiving unit, the scheduled presence sending unit, and the scheduled presence receiving unit, which are shown in the above embodiment, may be achieved as a separate unit.

Figure 16:
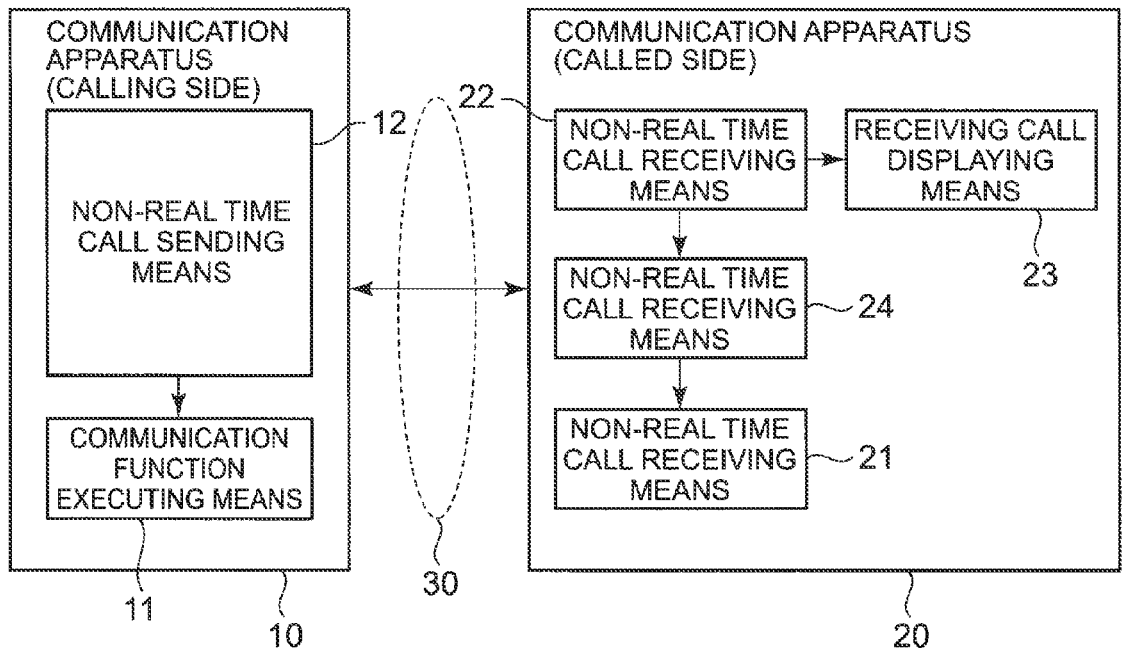
FIG. 16 is a block diagram illustrating outline of the present invention.
Figure 17:
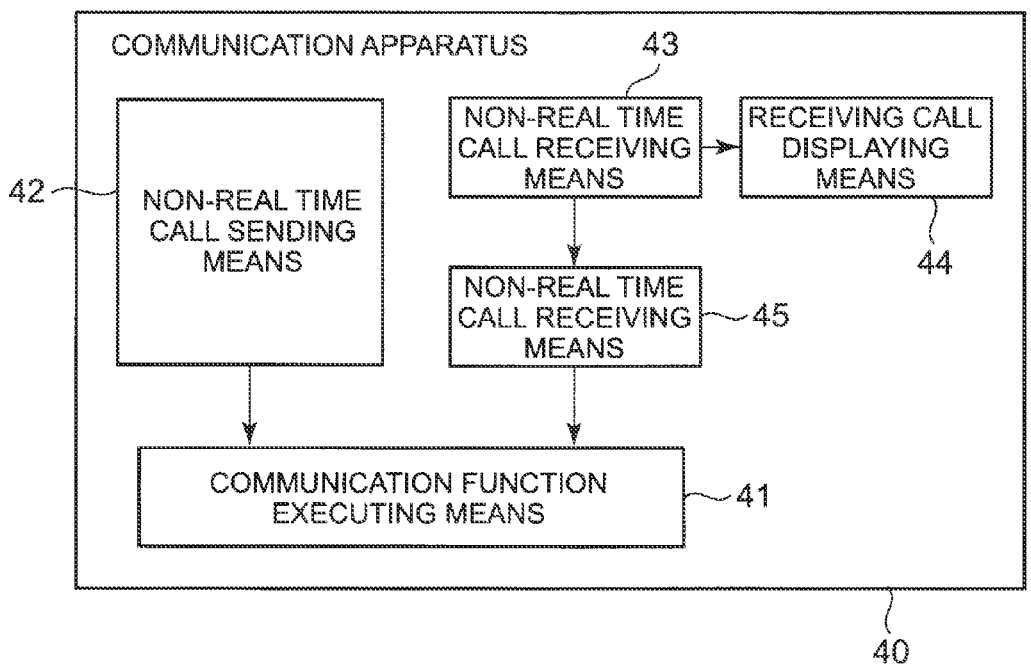
FIG. 17 is a block diagram illustrating outline of the present invention.

Subsequently, outline of the present invention will be explained. FIGS. 16 and 17 are block diagrams illustrating outline of the present invention. FIG. 16 is a block diagram illustrating an example of schematic configuration where the present invention is applied to a communication system. The communication system as illustrated in FIG. 16 includes a calling side communication apparatus 10 and a called side communication apparatus 20, which are connected via a communication network 30. The calling side communication apparatus 10 includes communication function executing means 11 and non-real time call sending means 12. The called side communication apparatus 20 includes communication function executing means 21, non-real time call receiving means 22, receiving call displaying means 23, and non-real time call responding means 24.

FIG. 17 is a block diagram illustrating an example of schematic configuration where the present invention is applied to a communication apparatus. The example as illustrated in FIG. 17 is an example where each means of the calling side communication apparatus and each means of the called side communication apparatus as illustrated in FIG. 16 are implemented using one communication apparatus. More specifically, the communication apparatus as illustrated in FIG. 17 includes communication function executing means 41, non-real time call sending means 42, non-real time call receiving means 43, receiving call displaying means 44, and non-real time call responding means 45.

The communication function executing means 11, 21, 41 execute telephone call or data communication with a specified communication apparatus. In the above embodiment, for example, the communication function executing means is illustrated as the telephone communication unit 104.

The non-real time call sending means 12, 42 send, in accordance with user operation, a non-real time call which is a request of telephone call without entailing forcible ringing and is a request of telephone call which continues until a user at the other side responds or until a predetermined cancellation condition is satisfied. For example, a non-real time call may be made by sending a non-real time call starting signal conveying the will of making a non-real time call telephone call. In the above embodiment, the non-real time call sending means is illustrated as, for example, the non-real time call sending unit 101.

The non-real time call receiving means 22, 43 receive the non-real time call, which is made to the communication apparatus, without entailing forcible ringing. For example, the non-real time call receiving means 22, 43 may receive the non-real time call by receiving a non-real time call starting signal and changing to the receiving call reception state in which the non-real time call receiving means 22, 43 wait for response operation performed by a user. For example, in the receiving call reception state, information about the receiving non-real time call is held so that it can be presented to the user at any time, while at least the non-real time call continues. In the above embodiment, the non-real time call receiving means is illustrated as, for example, the non-real time call receiving unit 102.

The receiving call displaying means 23, 44 display, to the user, information about non-real time call currently in the call reception state. For example, in response to a request given by a user, the information about the non-real time calls currently in the call reception state may be displayed on the GUI. In the above embodiment, the receiving call displaying means 23 is illustrated as one function of the non-real time call receiving unit 102. As a more specific example, it is shown as a receiving call display function unit of FIG. 9, for example.

The non-real time call responding means 24, 45 establish a telephone call or a data communication with the communication apparatus that sent the non-real time call, in accordance with response operation given by a user in reply to a non-real time call currently in the call reception state. Alternatively, a telephone call or a data communication may be established with the communication apparatus that sent the non-real time call, by performing control to make call back, for example. Still alternatively, a telephone call or a data communication may be established with the communication apparatus that sent the non-real time call, by sending, to the originating party, a response signal indicating that the called user has responded to the request of telephone call by means of non-real time call, for example.

Some or all of the above embodiments may also be described as follows, but are not limited thereto.

(Addition 1) A communication system comprising a calling side communication apparatus used by a calling user and a called side communication apparatus used by a called user, wherein the calling side communication apparatus includes: communication function executing means for executing a telephone call or a data communication with a specified communication apparatus; and non-real time call sending means for sending, in accordance with user operation, a non-real time call which is a request of telephone call without entailing forcible ringing and is a request of telephone call which continues until a user at the other side responds or until a predetermined cancellation condition is satisfied, and the called side communication apparatus includes: communication function executing means for executing a telephone call or a data communication with a specified communication apparatus; non-real time call receiving means for receiving, without entailing forcible ringing, a non-real time call made to the communication apparatus; receiving call displaying means for displaying, to the user, information about a non-real time call currently in a call reception state; and non-real time call responding means for establishing a telephone call or a data communication with the communication apparatus that sent the non-real time call, in accordance with a response operation given by the user in reply to the non-real time call currently in the call reception state.

(Addition 2) A communication apparatus comprising: communication function executing means for executing a telephone call or a data communication with a specified communication apparatus; non-real time call sending means for sending, in accordance with user operation, a non-real time call which is a request of telephone call without entailing forcible ringing and is a request of telephone call which continues until a user at the other side responds or until a predetermined cancellation condition is satisfied; non-real time call receiving means for receiving, without entailing forcible ringing, a non-real time call made to the communication apparatus; receiving call displaying means for displaying, to the user, information about a non-real time call currently in a call reception state; and non-real time call responding means for establishing a telephone call or a data communication with the communication apparatus that sent the non-real time call, in accordance with a response operation given by the user in reply to the non-real time call currently in the call reception state.

(Addition 3) The communication apparatus according to Addition 2, wherein when the non-real time call is received, the receiving call displaying means gives notification by a method that does not bother user's operation, and during the call reception, the receiving call displaying means displays, in accordance with user operation, the information about the non-real time call currently in a call reception state to the user by outputting the information using spoken sound or a GUI.

(Addition 4) The communication apparatus according to Addition 2 or 3, wherein the non-real time call sending means sends a signal including presence information indicating whether the user can make a telephone call or a data communication, with a regular cycle or in response to a poll sent from the called side communication apparatus while the non-real time call continues, the non-real time call receiving means receives the signal of the non-real time call currently in the call reception state, the receiving call displaying means displays, to the user, information including a content of the received presence information, as the information about the non-real time call currently in the call reception state.

(Addition 5) The communication apparatus according to any one of Additions 2 to 4, wherein the non-real time call sending means includes real time presence information sending means for sending, to the called side communication apparatus, real time presence information which is information representing a state of the communication apparatus or the user of the communication apparatus using a degree of certainty that the user is in a state ready to make a communication, with predetermined timing while the non-real time call continues, the non-real time call receiving means includes real time presence information receiving means for receiving the real time presence information about the non-real time call currently in the call reception state, and the receiving call displaying means displays, to the user, information including a content of the received real time presence information, as information about the non-real time call currently in the call reception state.

(Addition 6) The communication apparatus according to Addition 5, wherein the receiving call displaying means uses, as a method for expressing the real time presence information, a method other than displaying a numerical value as it is.

(Addition 7) The communication apparatus according to any one of Additions 2 to 6, wherein the non-real time call sending means includes scheduled presence information sending means for sending scheduled presence information which is presence information derived from user's schedule information with sending of the non-real time call or with predetermined timing while the non-real time call continues and is presence information indicating whether the user can make a telephone call or a data communication, on every predetermined period of time, the non-real time call receiving means includes scheduled presence information receiving means for receiving the scheduled presence information about the receiving non-real time call or the non-real time call currently in the call reception state, and receiving call displaying means displays, to the user, information including a content of presence information in a period of time corresponding to at least a current time indicated by the received scheduled presence information, as the information about the non-real time call currently in the call reception state.

(Addition 8) The communication apparatus according to Addition 7, wherein the scheduled presence information sending means sends the scheduled presence information as well as the schedule information, the scheduled presence information receiving means receives the scheduled presence information as well as the schedule information, and the receiving call displaying means displays, to the user, information including a content of the received schedule information as well as the scheduled presence information, as the information about the non-real time call currently in the call reception state.

(Addition 9) The communication apparatus according to any one of Additions 4 to 8, wherein the non-real time call receiving means determines, with regard to the non-real time call currently in the call reception state, as to whether the non-real time call currently in the call reception state is valid or invalid at a regular interval or on the basis of a reception state of a signal sent from the calling side communication apparatus in reply to a pole sent from the called side communication apparatus.

(Addition 10) The communication apparatus according to any one of Additions 4 to 9, wherein the non-real time call receiving means determines, with regard to the non-real time call currently in the call reception state, as to whether the non-real time call currently in the call reception state is valid or invalid on the basis of presence information in a period of time corresponding to a current time indicated by the received presence information, the real time presence information, or the scheduled presence information.

(Addition 11) The communication apparatus according to any one of Additions 2 to 10, wherein the non-real time call sending means sends a signal for invalidation the non-real time call which is currently continued, in accordance with user operation, and the non-real time call receiving means disables a corresponding non-real time call when the signal is received.

(Addition 12) A communication control method for establishing a telephone call or a data communication with a specified communication apparatus, the communication control method comprising: causing a calling side communication apparatus to send, in accordance with user operation, a non-real time call which is a request of telephone call without entailing forcible ringing and is a request of telephone call which continues until a user at the other side responds or until a predetermined cancellation condition is satisfied; causing the called side communication apparatus to receive the non-real time call made to the communication apparatus, without entailing forcible ringing, and to hold information about the received non-real time call in such a manner that the information can be presented to a user at all times while at least the non-real time call is continued; and causing the called side communication apparatus to establish a telephone call or a data communication with the communication apparatus that sent the non-real time call, in accordance with a response operation given by the user in reply to the non-real time call currently in the call reception state.

(Addition 13) A communication program for a computer having a communication function for performing a telephone call or a data communication with a specified communication apparatus, the communication program causing the computer to execute: non-real time call sending processing for sending, in accordance with user operation, a non-real time call which is a request of telephone call without entailing forcible ringing and is a request of telephone call which continues until a user at the other side responds or until a predetermined cancellation condition is satisfied; non-real time call reception processing for receiving the non-real time call made to the communication apparatus, without entailing forcible ringing; receiving call display processing for displaying, to a user, information about the non-real time call currently in the call reception state; and non-real time call response processing for establishing a telephone call or a data communication with the communication apparatus that sent the non-real time call, in accordance with a response operation given by the user in reply to the non-real time call currently in the call reception state.

The invention of the present application has been hereinabove explained with reference to the embodiments and examples. However, the invention of the present application is not limited to the above embodiments and examples. The configuration and details of the invention of the present application can be changed in various manners, which can be understood by a person skilled in the art, within the scope of the invention of the present application.

This application claims priority based on Japanese Patent Application No. 2010-089098 filed on Apr. 8, 2010, and all the disclosure therein is incorporated herein.

Industrial Applicability

The present invention can be applied to anything that has basic telephone call or data communication function. For example, the present application can be applied to a softphone, a cell phone, a smartphone, a POS terminal, voice chat software, a fixed phone, and the like.

Reference Signs List 100A, 100B Communication apparatus (calling side/called side)
101 Non-real time call sending unit
102 Non-real time call receiving unit
103 Non-real time call responding unit
104 Telephone communication unit
105 Real time presence sending unit
106 Real time presence receiving unit
107 Scheduled presence sending unit
108 Scheduled presence receiving unit
200, 30 Communication network
10, 20, 40 Communication apparatus (calling side/called side/for both of sending and reception)
11, 21, 41 Communication function executing means
21 Communication function executing means
12 Non-real time call sending means
22 Non-real time call receiving means
23 Receiving call displaying means
24 Non-real time call responding means

The invention claimed is:

1. A communication system comprising a calling side communication apparatus used by a calling user and a called side communication apparatus used by a called user,
   wherein the calling side communication apparatus includes:
   a communication function executing unit which executes a telephone call or a data communication with a specified communication apparatus; and
   a non-real time call sending unit which sends, in accordance with user operation, a non-real time call defined as a request of telephone call without entailing forcible ringing and is a request of telephone call which continues until the called user at the other side responds or until a predetermined cancellation condition is satisfied, and
   the called side communication apparatus includes:
   a communication function executing unit which executes a telephone call or a data communication with a specified communication apparatus;
   a non-real time call receiving unit which receives, without entailing forcible ringing, the non-real time call made to the called side communication apparatus;
   a receiving call displaying unit which displays, to the called user, information about the non-real time call currently in a call reception state; and
   a non-real time call responding unit which establishes a telephone call or a data communication with the communication apparatus that sent the non-real time call, in accordance with a response operation given by the called user in reply to the non-real time call currently in the call reception state; and
   wherein the non-real time call sending unit includes a real time presence information sending unit which sends, to the called side communication apparatus, real time presence information, detected by the calling side communication apparatus, which is information representing a state of the calling side communication apparatus or the calling user of the calling side communication apparatus using a degree of certainty that the calling user is in a state ready to make a communication, with predetermined timing while the non-real time call continues,
   the state detected by the calling side communication apparatus is continuously updated on the called side communication apparatus based on the time elapsed since the calling user manipulated the calling side communication apparatus,
   the non-real time call receiving unit includes a real time presence information receiving unit which receives the real time presence information about the non-real time call currently in the call reception state, and
   the receiving call displaying unit displays, to the called user, information including a content of the received real time presence information, as information about the non-real time call currently in the call reception state.

2. A communication apparatus comprising:
   a communication function executing unit which executes a telephone call or a data communication with a specified communication apparatus;
   a non-real time call sending unit which sends, in accordance with user operation, a non-real time call defined as a request of telephone call without entailing forcible ringing and is a request of telephone call which continues until a called user at the other side responds or until a predetermined cancellation condition is satisfied;
   a non-real time call receiving unit which receives, without entailing forcible ringing, the non-real time call;
   a receiving call displaying unit which displays, to the called user, information about the non-real time call currently in a call reception state; and
   a non-real time call responding unit which establishes a telephone call or a data communication with a calling side communication apparatus that sent the non-real time call, in accordance with a response operation given by the called user in reply to the non-real time call currently in the call reception state,
   wherein the non-real time call sending unit includes a real time presence information sending unit which sends, to a called side communication apparatus, real time presence information, detected by the calling side communication apparatus, which is information representing a state of the calling side communication apparatus or a calling user of the calling side communication apparatus using a degree of certainty that the calling user is in a state ready to make a communication, with predetermined timing while the non-real time call continues, the state detected by the calling side communication apparatus is continuously updated on the called side communication apparatus based on the time elapsed since the calling user manipulated the calling side communication apparatus, the non-real time call receiving unit includes a real time presence information receiving unit which receives the real time presence information about the non-real time call currently in the call reception state, and the receiving call displaying unit displays, to the called user, information including a content of the received real time presence information, as information about the non-real time call currently in the call reception state.

3. The communication apparatus according to claim 2, wherein when the non-real time call is received, the receiving call displaying unit gives notification by a method that does not bother the called user's operation, and during the call reception, the receiving call displaying unit displays, in accordance with user operation, the information about the non-real time call currently in a call reception state to the called user by outputting the information using spoken sound or a GUI.

4. The communication apparatus according to claim 2, wherein the non-real time call sending unit sends a signal including presence information indicating whether the calling user can make a telephone call or a data communication, with a regular cycle or in response to a poll sent from the called side communication apparatus while the non-real time call continues, the non-real time call receiving unit receives the signal of the non-real time call currently in the call reception state, the receiving call displaying unit displays, to the called user, information including a content of the received presence information, as the information about the non-real time call currently in the call reception state.

5. The communication apparatus according to claim 2, wherein the receiving call displaying unit uses, as a method for expressing the real time presence information, a method other than displaying a numerical value as it is.

6. The communication apparatus according to claim 2, wherein the non-real time call sending unit includes a scheduled presence information sending unit which sends scheduled presence information which is presence information derived from calling user's schedule information with sending of the non-real time call or with predetermined timing while the non-real time call continues and is presence information indicating whether the calling user can make a telephone call or a data communication, on every predetermined period of time, the non-real time call receiving unit includes a scheduled presence information receiving unit which receives the scheduled presence information about the receiving non-real time call or the non-real time call currently in the call reception state, and the receiving call displaying unit displays, to the called user, information including a content of presence information in a period of time corresponding to at least a current time indicated by the received scheduled presence information, as the information about the non-real time call currently in the call reception state.

7. The communication apparatus according to claim 6, wherein the scheduled presence information sending unit sends the scheduled presence information as well as the schedule information, the scheduled presence information receiving unit receives the scheduled presence information as well as the schedule information, and the receiving call displaying unit displays, to the called user, information including a content of the received schedule information as well as the scheduled presence information, as the information about the non-real time call currently in the call reception state.

8. The communication apparatus according to claim 4, wherein the non-real time call receiving unit determines, with regard to the non-real time call currently in the call reception state, as to whether the non-real time call currently in the call reception state is valid or invalid at a regular interval or on the basis of a reception state of a signal sent from the calling side communication apparatus in reply to a pole sent from the called side communication apparatus.

9. The communication apparatus according to claim 4, wherein the non-real time call receiving unit determines, with regard to the non-real time call currently in the call reception state, as to whether the non-real time call currently in the call reception state is valid or invalid on the basis of presence information in a period of time corresponding to a current time indicated by the received presence information, the real time presence information, or the scheduled presence information.

10. The communication apparatus according to claim 2, wherein the non-real time call sending unit sends a signal for invalidation the non-real time call which is currently continued, in accordance with user operation, and the non-real time call receiving unit disables a corresponding non-real time call when the signal is received.

11. A communication control method for establishing a telephone call or a data communication with a specified communication apparatus, the communication control method comprising:

causing a calling side communication apparatus to send, in accordance with user operation, a non-real time call defined as a request of telephone call without entailing forcible ringing and is a request of telephone call which continues until a called user at the other side responds or until a predetermined cancellation condition is satisfied;

causing a called side communication apparatus to receive the non-real time call made to the called side communication apparatus, without entailing forcible ringing, and to hold information about the received non-real time call in such a manner that the information can be presented to the called user at all times while at least the non-real time call is continued;

causing the called side communication apparatus to establish a telephone call or a data communication with the communication apparatus that sent the non-real time call, in accordance with a response operation given by the called user in reply to the non-real time call currently in the call reception state, causing the calling side communication apparatus to send to the called side communication apparatus, real time presence information, detected by the calling side communication apparatus, which is information representing a state of the calling side communication apparatus or a calling user of the calling side communication apparatus using a degree of certainty that the calling user is in a state ready to make a communication, with predetermined timing while the non-real time call continues, causing the called side communication apparatus to receive the real time presence information about the non-real time call currently in the call reception state, and causing the called side communication apparatus to display, to the called user, information about the non-real time call currently in a call reception state, wherein the state detected by the calling side communication apparatus is continuously updated on the called side communication apparatus based on the time elapsed since the calling user manipulated the calling side communication apparatus.

12. A non-transitory computer readable information recording medium storing a communication program for a processor having a communication function for performing a telephone call or a data communication with a specified communication apparatus, when executed in a communication apparatus, sending a non-real time call, in accordance with user operation, which is a request of telephone call without entailing forcible ringing and is a request of telephone call which continues until a called user at the other side responds or until a predetermined cancellation condition is satisfied;

receiving the non-real time call made to the communication apparatus, without entailing forcible ringing;

displaying, to the called user, information about the non-real time call currently in the call reception state; and establishing a telephone call or a data communication with a source communication apparatus that sent the non-real time call, in accordance with a response operation given by the called user in reply to the non-real time call currently in the call reception state, sending real time presence information, detected by the communication apparatus, which is information representing a state of the communication apparatus or a calling user of the communication apparatus using a degree of certainty that the calling user is in a state ready to make a communication, with predetermined timing while the non-real time call continues, continuously updating the state detected by the communication apparatus and displayed to the called user based on the time elapsed since the calling user manipulated the communication apparatus, receiving the real time presence information about the non-real time call currently in the call reception state, and displaying, to the called user, information about the non-real time call currently in a call reception state.

\* \* \* \* \*